US010739969B2

(12) United States Patent
Seong et al.

(10) Patent No.: US 10,739,969 B2
(45) Date of Patent: Aug. 11, 2020

(54) TERMINAL AND METHOD FOR CONTROLLING SAME

(71) Applicant: LG ELECTRONICS INC., Seoul (KR)

(72) Inventors: Hangdong Seong, Seoul (KR); Dongseon Park, Seoul (KR); Younjeong Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 885 days.

(21) Appl. No.: 15/031,442

(22) PCT Filed: Oct. 23, 2013

(86) PCT No.: PCT/KR2013/009460
§ 371 (c)(1),
(2) Date: Apr. 22, 2016

(87) PCT Pub. No.: WO2015/060470
PCT Pub. Date: Apr. 30, 2015

(65) Prior Publication Data
US 2016/0274771 A1 Sep. 22, 2016

(51) Int. Cl.
*G06F 3/0484* (2013.01)
*G06F 16/58* (2019.01)
(Continued)

(52) U.S. Cl.
CPC ........ *G06F 3/04845* (2013.01); *G06F 3/0482* (2013.01); *G06F 3/04817* (2013.01);
(Continued)

(58) Field of Classification Search
CPC .............. G06F 3/0482; G06F 3/04842; G06F 3/04817; G06F 3/0481; G06F 3/048; G06F 3/04845; G06F 2203/04808; G06F 16/54; G06F 16/58; G06F 16/26; G06F 16/5866; G06F 3/04883; H04M 1/72522; H04M 1/72566; G05B 2219/31474; G06Q 50/01
(Continued)

(56) References Cited

U.S. PATENT DOCUMENTS 7,716,194 B2 *  5/2010  Williams ............ G06F 16/5846
                                                    707/705
2006/0069998 A1 * 3/2006  Artman ................. G06F 16/907
                                                    715/721
(Continued)

FOREIGN PATENT DOCUMENTS

KR    10-2012-0049518 A    5/2012
KR    10-2012-0139459 A    12/2012
(Continued)

*Primary Examiner* — Matthew Ell
*Assistant Examiner* — Maria S Ayad
(74) *Attorney, Agent, or Firm* — Birch, Stewart, Kolasch & Birch, LLP

(57) ABSTRACT

The present invention relates to a mobile terminal and a method for controlling the same, which can allow the use of a terminal to be implemented by further considering user convenience. According to at least one of the embodiments of the present invention, the present invention provides the advantage of easily sharing copied and scraped content through a plurality of mobile terminals.

14 Claims, 31 Drawing Sheets

(51) Int. Cl.
    *G06F 16/54*         (2019.01)
    *G06F 3/0481*       (2013.01)
    *G06F 3/0482*       (2013.01)
    *G06F 3/0488*       (2013.01)
    *G06Q 50/00*       (2012.01)

(52) U.S. Cl.
    CPC ...... G06F 3/04842 (2013.01); G06F 3/04883 (2013.01); G06F 16/54 (2019.01); G06F 16/5866 (2019.01); *G06F 2203/04808* (2013.01); *G06Q 50/01* (2013.01)

(58) Field of Classification Search
    USPC ........ 715/838, 764, 255, 810, 854, 841, 748
    See application file for complete search history.

(56) References Cited

U.S. PATENT DOCUMENTS

| | | | |
|---|---|---|---|
| 2006/0090141 A1* | 4/2006 | Loui | G06F 16/54 715/764 |
| 2007/0106952 A1* | 5/2007 | Matas | G06F 16/9577 715/764 |
| 2008/0222557 A1* | 9/2008 | Abe | G06F 3/0482 715/784 |
| 2009/0106666 A1* | 4/2009 | Nomura | G06F 16/168 715/748 |
| 2010/0188427 A1* | 7/2010 | Chuang | G06Q 10/00 345/660 |
| 2011/0302502 A1* | 12/2011 | Hart | G06F 11/1448 715/747 |
| 2012/0162251 A1* | 6/2012 | Minamino | G11B 27/34 345/629 |
| 2012/0311509 A1* | 12/2012 | Maggiotto | G06F 3/04817 715/863 |
| 2013/0121668 A1* | 5/2013 | Meaney | G11B 27/031 386/282 |
| 2014/0093175 A1* | 4/2014 | Morimoto | G06K 9/00221 382/195 |
| 2014/0157319 A1* | 6/2014 | Kimura | H04N 21/252 725/46 |

FOREIGN PATENT DOCUMENTS

| | | |
|---|---|---|
| KR | 10-2013-0083957 A | 7/2013 |
| KR | 10-2013-0086833 A | 8/2013 |

\* cited by examiner

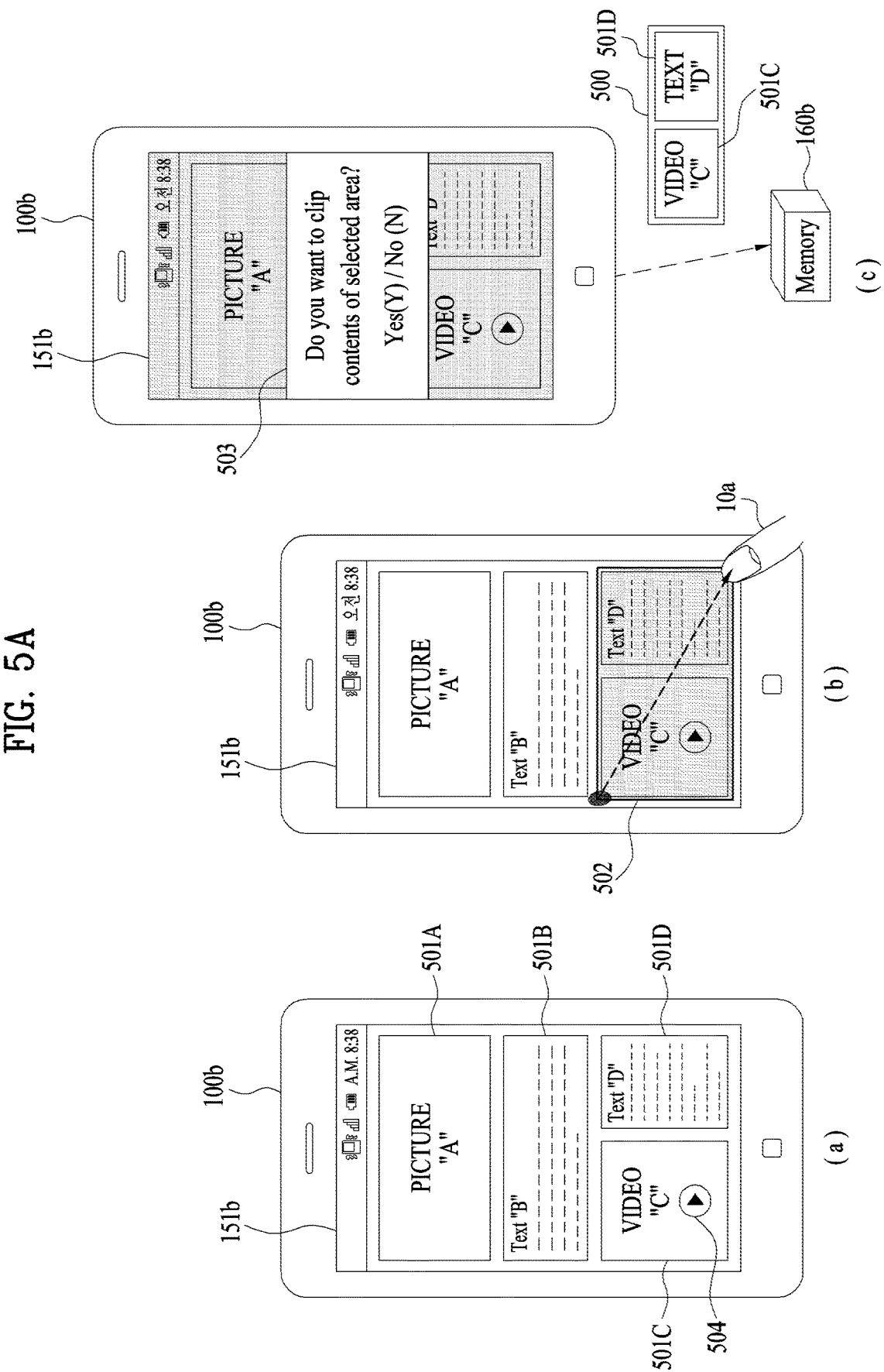

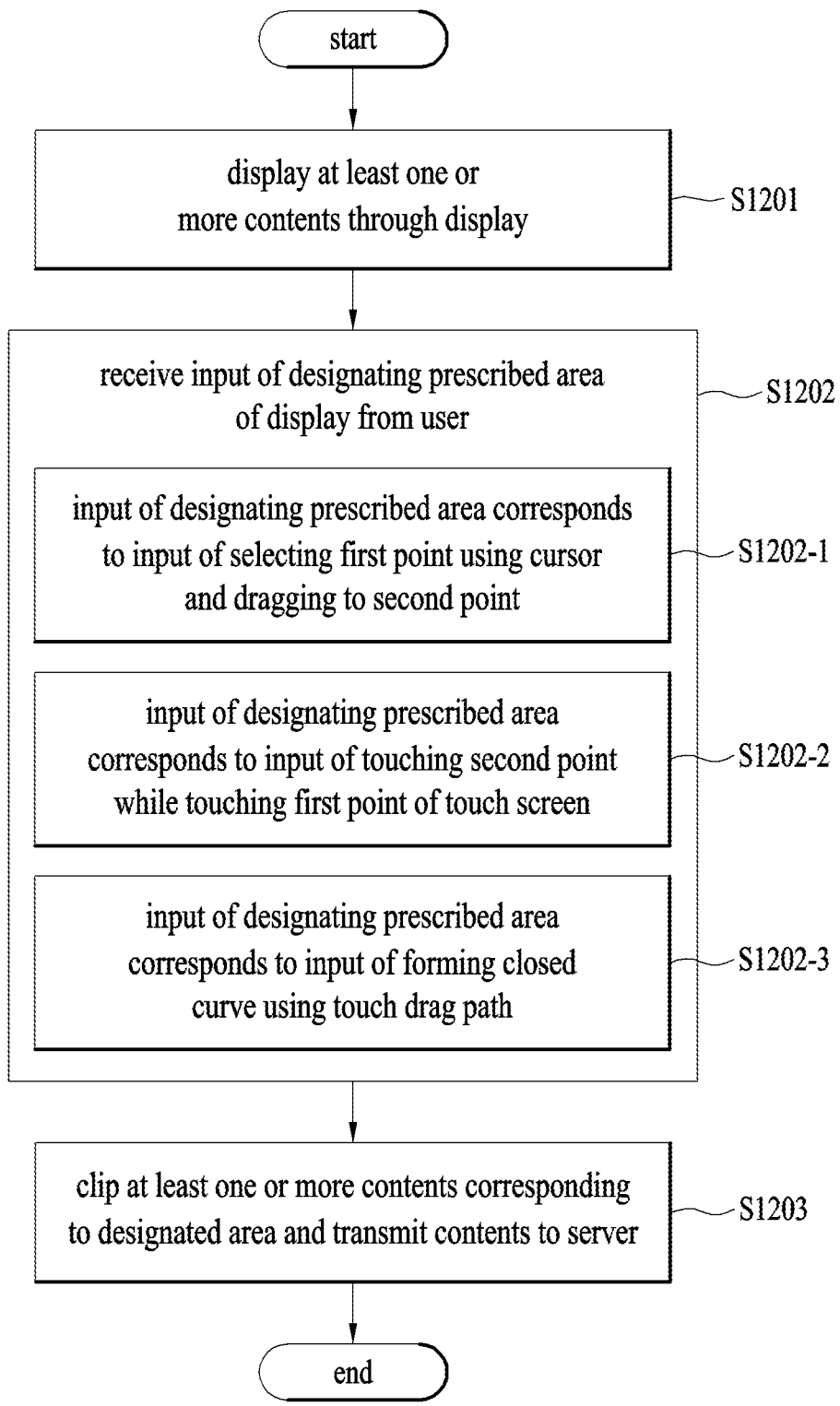

| clipped contents | number of linked applications |
|---|---|
| first content | 2 |
| second content | 1 |
| third content | 4 |
| fourth content | 5 |
| fifth content | 0 |
| sixth content | 3 |
| seventh content | 4 |

(a)

(b)

TERMINAL AND METHOD FOR CONTROLLING SAME

CROSS-REFERENCE TO RELATED APPLICATIONS

This Application is a National Phase of PCT International Application No. PCT/KR2013/009460 filed on Oct. 23, 2013, the contents of which are incorporated by reference herein in its entirety.

BACKGROUND OF THE INVENTION

Field of the Invention

The present invention relates to a mobile terminal enabling a user to more conveniently use the mobile terminal and a method of controlling therefor.

Discussion of the Related Art

A terminal can be classified into a mobile/portable terminal and a stationary terminal in accordance with whether the terminal is capable of being moved. Again, the mobile terminal can be divided into a handheld (type) terminal and a vehicle mounted terminal.

As the function of the terminal is diversified, the terminal is implemented in a form of a multimedia player equipped with multiple functions such as capturing a picture or a video, playing a music file or a video file, playing a game, receiving a broadcast and the like.

In order to support and increase the function of the terminal, it may consider improving a structural part and/or a software part of the terminal.

Not only data transmission and reception speed but also storage capacity of data storing devices is increasing. Hence, a mobile terminal supporting a webhard (cloud) service is increasing. The webhard service corresponds to a service that provides a virtual data storage space on the web according to a user. A user performs user authentication through a login and may be then able to access the virtual data storage space.

When a single user uses a plurality of terminals, the webhard service has an advantage in that the user is able to use same data no matter which terminal the user uses among a plurality of the terminals.

Recently, the webhard service is used not only for the aforementioned usage but also for a usage of sharing data between users of a certain group. Hence, it is required to perform a study on a method of controlling a terminal to more conveniently share data between users.

SUMMARY OF THE INVENTION

The present invention is proposed to satisfy the aforementioned necessity. An object of the present invention is to provide a mobile terminal enabling a user to conveniently clip various multimedia contents provided by the terminal and a method of controlling therefor.

The present invention is proposed to satisfy the aforementioned necessity. Another object of the present invention is to provide a mobile terminal capable of easily sharing contents, which are clipped through a plurality of terminals, and a method of controlling therefor.

Technical tasks obtainable from the present invention are non-limited the above mentioned technical tasks. And, other unmentioned technical tasks can be clearly understood from the following description by those having ordinary skill in the technical field to which the present invention pertains.

To achieve these and other advantages and in accordance with the purpose of the present invention, as embodied and broadly described, according to one embodiment, a terminal can include a display, a memory configured to store at least one or more clipped (scraped) contents, a wireless communication unit configured to receive the at least one or more clipped contents and a controller configured to control the display to display a time axis of a first scale, display a plurality of preview thumbnails in response to a plurality of clipped contents, display a plurality of date indicators indicating dates corresponding to a plurality of the preview thumbnails on the displayed time axis. In this case, the first scale can be determined on the basis of an interval of a clipped date between clipped contents corresponding to two preview thumbnails among a plurality of the displayed preview thumbnails.

To further achieve these and other advantages and in accordance with the purpose of the present invention, according to a different embodiment, a method of controlling a terminal can include the step of controlling a display to display a time axis of a first scale, a plurality of preview thumbnails in response to a plurality of clipped contents, and a plurality of date indicators indicating dates corresponding to a plurality of the preview thumbnails on the displayed time axis. In this case, the first scale can be determined on the basis of an interval of a clipped date between clipped contents corresponding to two preview thumbnails among a plurality of the displayed preview thumbnails.

Advantage and effectiveness of a mobile terminal according to the present invention and a method of controlling therefor are described in the following.

According to at least one of embodiments of the present invention, it is able to perform a clipping operation on a prescribed content by an easy input.

And, according to at least one of embodiments of the present invention, it is able to easily share clipped contents among a plurality of terminals.

In addition, according to at least one of embodiments of the present invention, it is able to provide a user interface capable of efficiently displaying clipped contents shared by a plurality of terminals.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

FIGS. 5a to 5c are diagram for a method of designating contents to be shared and a method of setting tag information and a sharing level to the designated contents according to one embodiment of the present invention;

FIG. 12 is a flowchart for a method of designating prescribed content and sharing the designated content according to one embodiment of the present invention;

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

A mobile terminal explained in the present specification may include a mobile phone, a smartphone, a laptop computer, a terminal used for digital broadcast, a PDA (personal digital assistant), a PMP (portable multimedia player), a navigation, and the like. Yet, except a case of applying a mobile terminal only, it is apparent to those who skilled in the art that a configuration according to embodiment of the present specification can also be applied to such a stationary terminal as a digital TV, a desktop computer, and the like.

Figure 1:
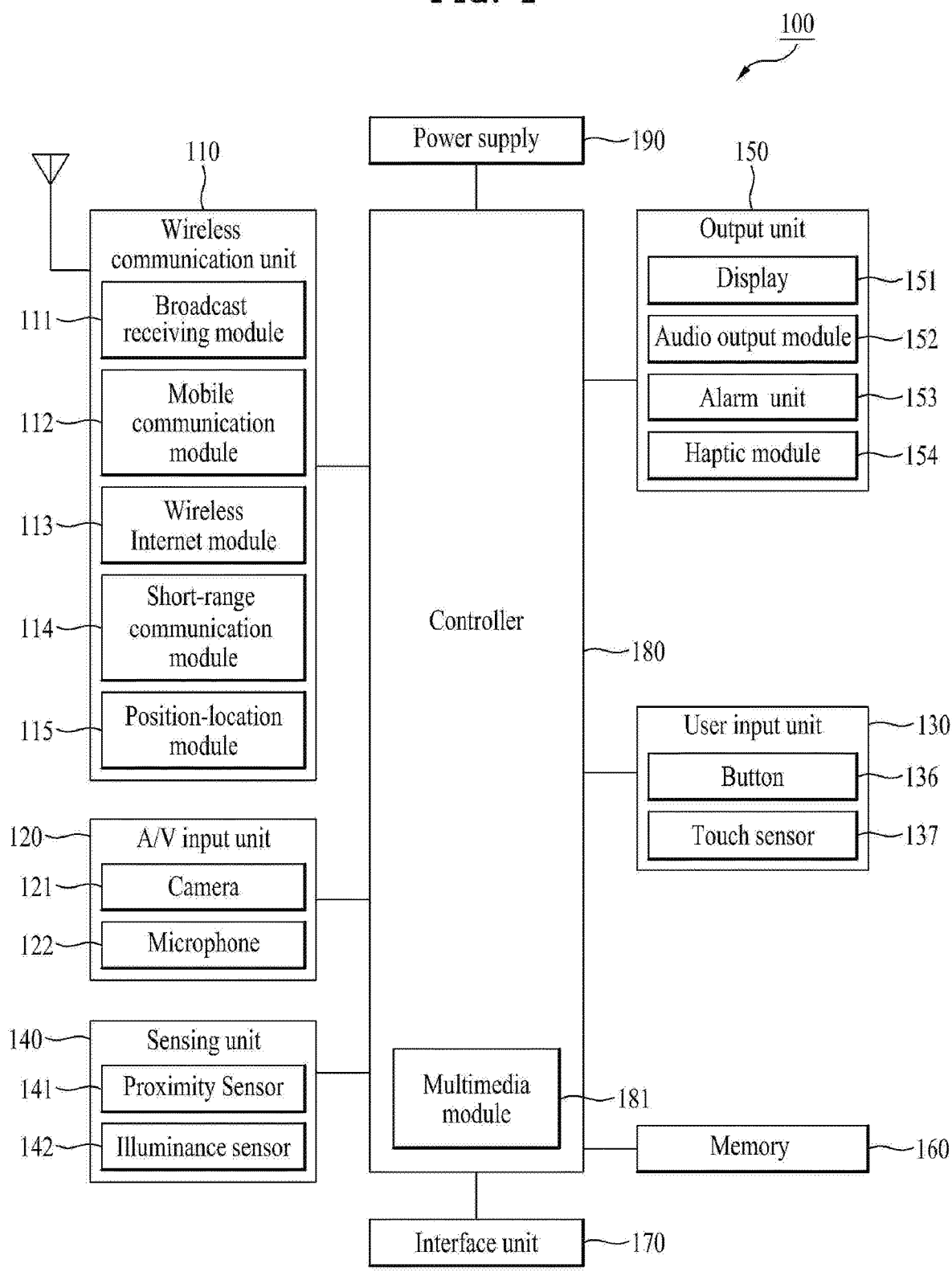
FIG. 1 is a block diagram for a mobile terminal related to one embodiment of the present invention.

FIG. 1 is a block diagram for a mobile terminal related to one embodiment of the present invention;

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), WIBRO (Wireless broadband), WIMAX (World Interoperability for Microwave Access), HSDPA (High Speed Downlink Packet Access), GSM, CDMA, WCDMA, LTE (Long Term Evolution) etc.

Wireless internet access by WIBRO, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated while receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), it can use the display 151 as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following, for clarity, when a pointer is close to the touch screen while not touching the touch screen, an act of making a position of the pointer to be recognized on the touch screen is referred to as "proximity touch" and an act of the pointer actually touching the touch screen may be referred to as "contact touch". A position of the pointer on the touch screen where the proximity touch is performed may indicate a position of the pointer vertically corresponding to the touch screen when the pointer is proximately touched.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160.

Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may become an embedded battery capable of being recharged and the battery can be combined with a terminal body for charging and the like although the battery is removable from the terminal body. A connection port can be configured as one example of the interface unit 170 to which an external charger for supplying power to the battery for charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the following description of the embodiments of the present invention, assume that a display unit 151 corresponds to a touch screen 151. Yet, the embodiments of the present invention may be non-limited by the touch screen 151.

And, in the embodiments of the present invention, a touch gesture corresponds to a gesture implemented by a contact touch or a proximity touch recognized on the touch screen 151 and a touch input corresponds to an input received by the touch gesture.

A touch gesture is classified into tapping, touch & drag, flicking, press, multi touch, pinch-in, pinch-out, etc.

The tapping is an operation of slightly pushing and releasing the touch screen 151. The tapping corresponds to a touch gesture similar to a mouse click in a general personal computer.

And, the touch & drag is an operation of moving a touch on the touch screen 151 to a specific position while maintaining the touch and then releasing the touch from the touch screen. If an object is dragged, the object can be continuously displayed while the object is moving according to drag direction.

And, the flicking is an operation of touching the touch screen 151, moving in specific direction (top, bottom, left, right, or diagonal direction) and then releasing a contact point. If a touch input is received by the flicking, a mobile terminal 100 performs processing of a specific operation based on flicking direction, flicking speed, and the like. For example, an operation of turning over pages of e-book can be performed based on flicking direction.

And, the press is an operation of touching the touch screen 151 and consistently maintaining the touch for more than predetermined time.

And, the multi touch is an operation of touching a plurality of points of the touch screen 151 at the same time.

And, the pinch-in is an operation of dragging a plurality of pointers touching the touch screen 151 in direction that a plurality of the pointers become close to each other. In particular, the pinch-in starts on at least one or more points among a plurality of the points touched on the touch screen 151 and drags a plurality of the multi-touched points in direction that the points are close to each other.

And, the pinch-out is an operation of dragging a plurality of pointers touching the touch screen 151 in direction that a plurality of the pointers becomes away from each other. In particular, the pinch-out starts on at least one or more points among a plurality of the points touched on the touch screen 151 and drags a plurality of the multi-touched points in direction that the points are away from each other.

Figure 2:
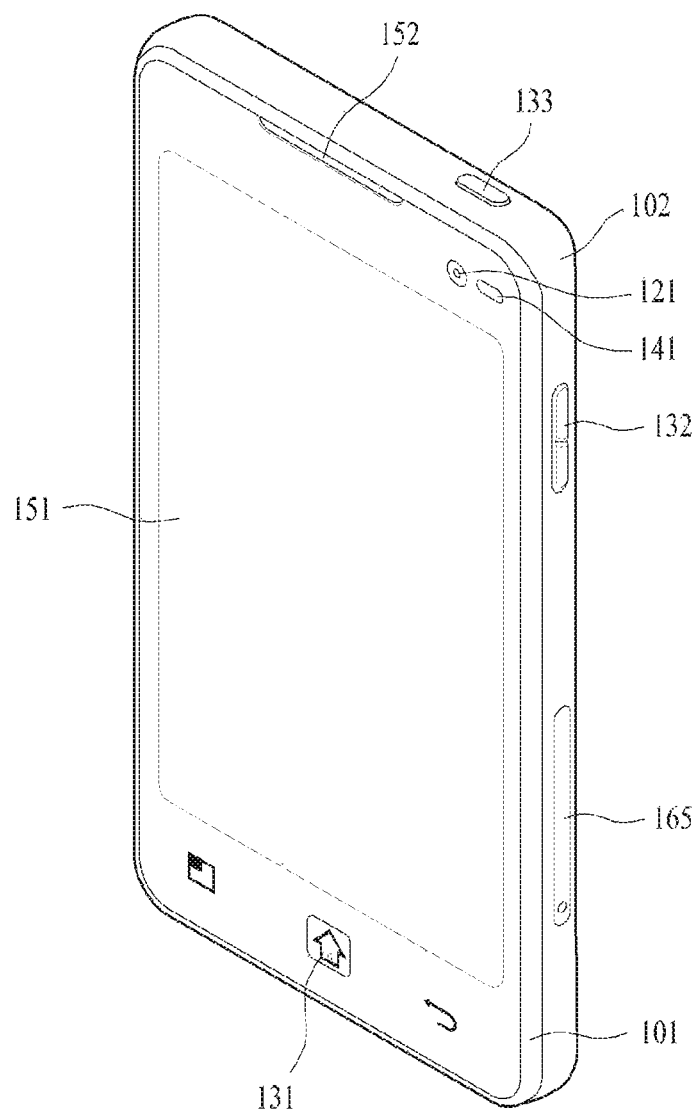
FIG. 2 is a perspective diagram of a front view for an example of a mobile terminal or a handheld terminal related to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further invention will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

In some cases, an electronic part can be mounted on a surface of the rear case 102. The electronic part mounted on the surface of the rear case 102 may include a battery capable of being removed by a user, a USIM card, a memory card, and the like. In this case, the rear case 102 may further include a rear cover 103 to cover the surface of the rear case. The rear cover 103 is formed in a structure capable of being easily removable by a user. If the rear cover 103 is uncovered, the surface of the rear case 102 is exposed.

As shown in FIG. 2, when the rear cover 103 is combined with the rear case, a part of sides of the rear case 102 can be exposed only. If a size of the rear cover 103 is reduced, a part of the back of the rear case 102 can also be exposed. If the rear cover 103 covers the whole of the back of the rear case 102, the rear cover may include an opening part 103' to expose a camera 121' or an audio output unit 152' to the external.

The cases 101 and 102 are formed by injection molding of synthetic resin or can be formed of metal substance such as stainless steel (STS), titanium (Ti) or the like for example.

Figure 3:
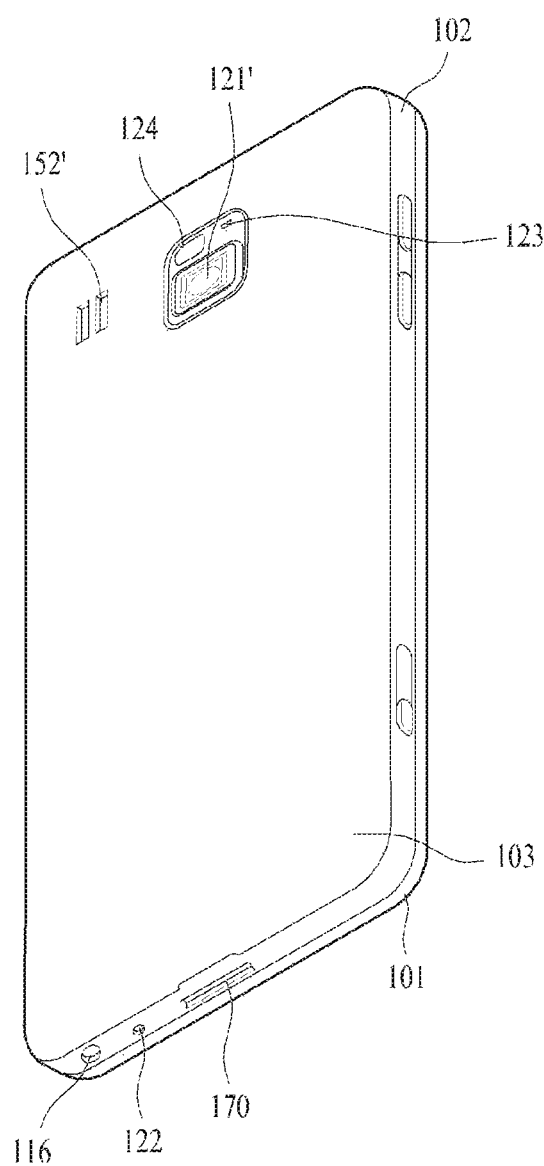
FIG. 3 is a perspective diagram of a rear view of the handheld terminal shown in FIG. 2.

As shown in FIGS. 2 and 3, a display 151, an audio output unit 152, a camera 121, user input units 130/131 and 132, proximity sensor 141, audio output unit 152, a microphone 122, an interface 170 (FIG. 3) and the like can be provided to the terminal body.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121' has a photographing direction that is substantially opposite to the camera 121 shown in FIG. 2 and may have pixels differing from those of the camera 121.

Preferably, for instance, the camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Not only data transmission and reception speed but also storage capacity of data storing devices is increasing. A webhard service corresponds to a service that provides a virtual data storage space on the web according to a user. A user performs user authentication through a login and may be then able to access the virtual data storage space.

When a single user uses a plurality of terminals, the webhard service has an advantage in that the user is able to use same data no matter which terminal the user uses among a plurality of the terminals.

In one embodiment of the present invention, a method of controlling a terminal for sharing data among users of a prescribed group is proposed. In particular, a controlling method for sharing clipped contents among users of a prescribed group is proposed. The clipped contents may correspond to contents to be separately stored by a user. For example, when a user reads a specific web page through a web browser, if there exist contents to be read later by separately storing the contents, an operation of storing the contents is referred to as clipping (scrapping) and the contents stored by the clipping operation may correspond to clipped contents.

In the following, embodiments related to a controlling method capable of being implemented in the aforementioned mobile terminal are explained with reference to attached drawings.

Figure 4:
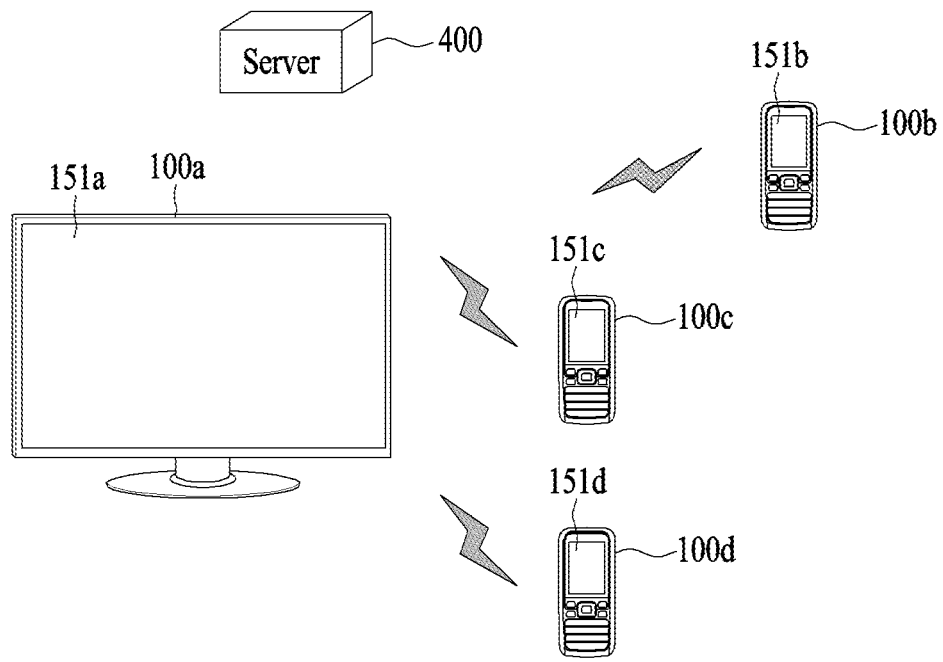
FIG. 4 is a diagram for a concept of a content sharing system according to one embodiment of the present invention.

FIG. 4 is a diagram for a concept of a content sharing system according to one embodiment of the present invention.

In one embodiment of the present invention, a method of sharing data among a plurality of terminals capable of exchanging data with each other (in FIGS. 4, 100a to 100d, the present invention may be non-limited by the number of terminals shown in FIG. 4) is provided.

In the embodiments of the present invention described in the following, 100a to 100d are referred to as first terminal to fourth terminal, respectively.

Referring to FIG. 4, a first terminal 100a has a shape of a television and the rest of terminals 100b to 100d have a shape of a mobile terminal. Recently, a terminal of a television shape equipped with a wired/wireless communication unit capable of transceiving data with an external device and a separate processor, i.e., a smart television, is provided. According to a legacy television, received broadcast data is displayed only via the television. In particular, data moves in one-way. On the contrary, since a smart television is able to transmit data based on a user input, data moves in two-way.

In explaining the embodiments of the present invention, although a terminal of a specific shape shown in FIG. 4 is exemplarily explained, it is apparent that the present invention may be non-limited by the shape of the terminal.

According to one embodiment of the present invention, data can be shared among a plurality of terminals in a manner that each of a plurality of the terminals transceives data with a separate server 400. In particular, if data to be shared is stored in the server 400, a plurality of the terminals can share the data in a manner that the server 400 allows a terminal intending to share the data to access the data stored in the server.

Meanwhile, although the server 400 can be implemented by a separate device, a terminal playing a role of a host among a plurality of the terminals may perform a role of the server instead. In particular, there is no restriction on whether or not the server 400 is equipped in the embodiments of the present invention.

In one embodiment of the present invention described in the following, assume that each of a plurality of the terminals 100a to 100d stores data in the server 400 and shares the data in a manner of giving an access right to the stored data.

In the following, a method of easily designating content to be shared is explained according to one embodiment of the present invention with reference to FIGS. 5a to 6.

Figure 5B:
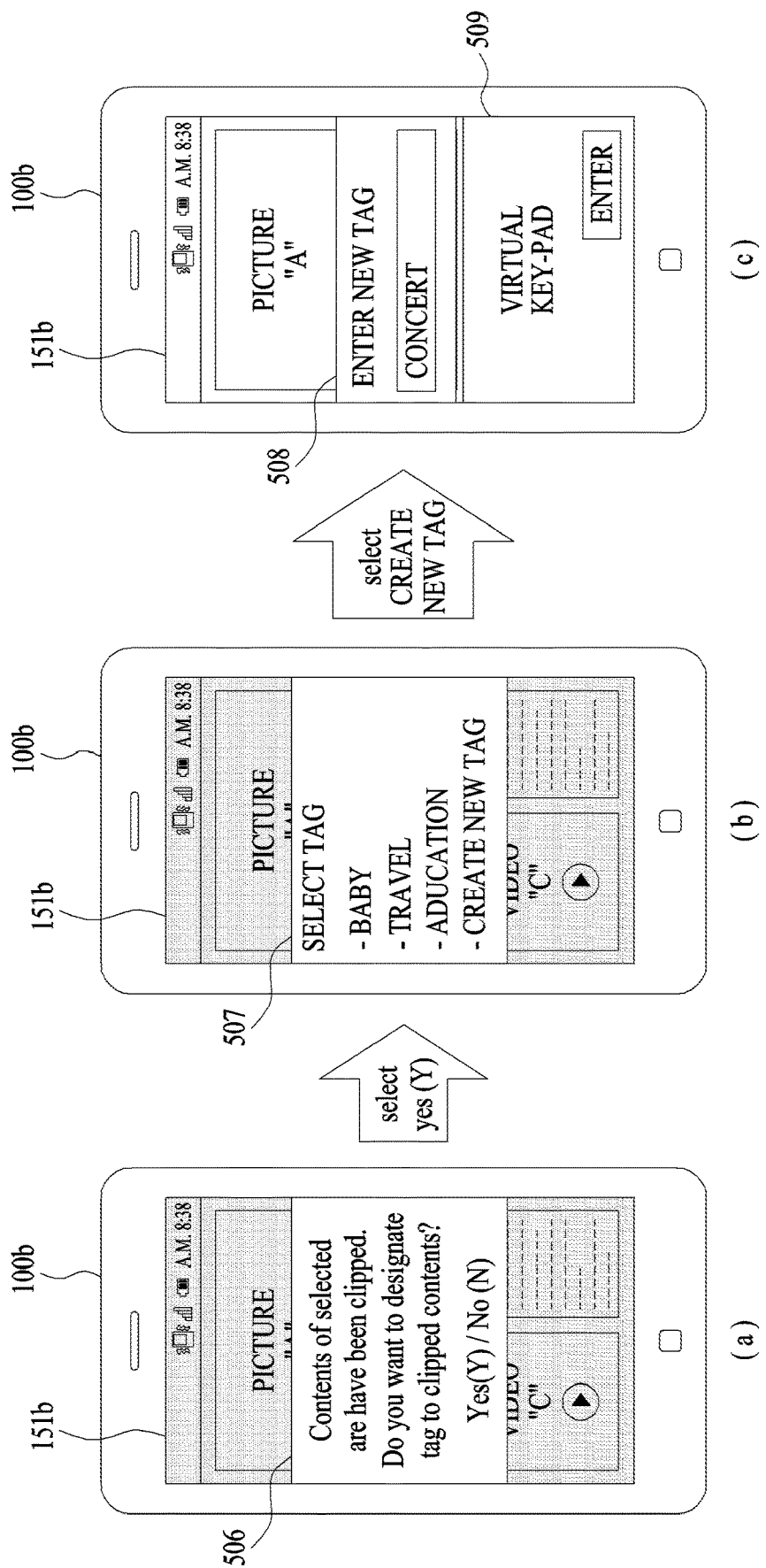
Figure 5C:
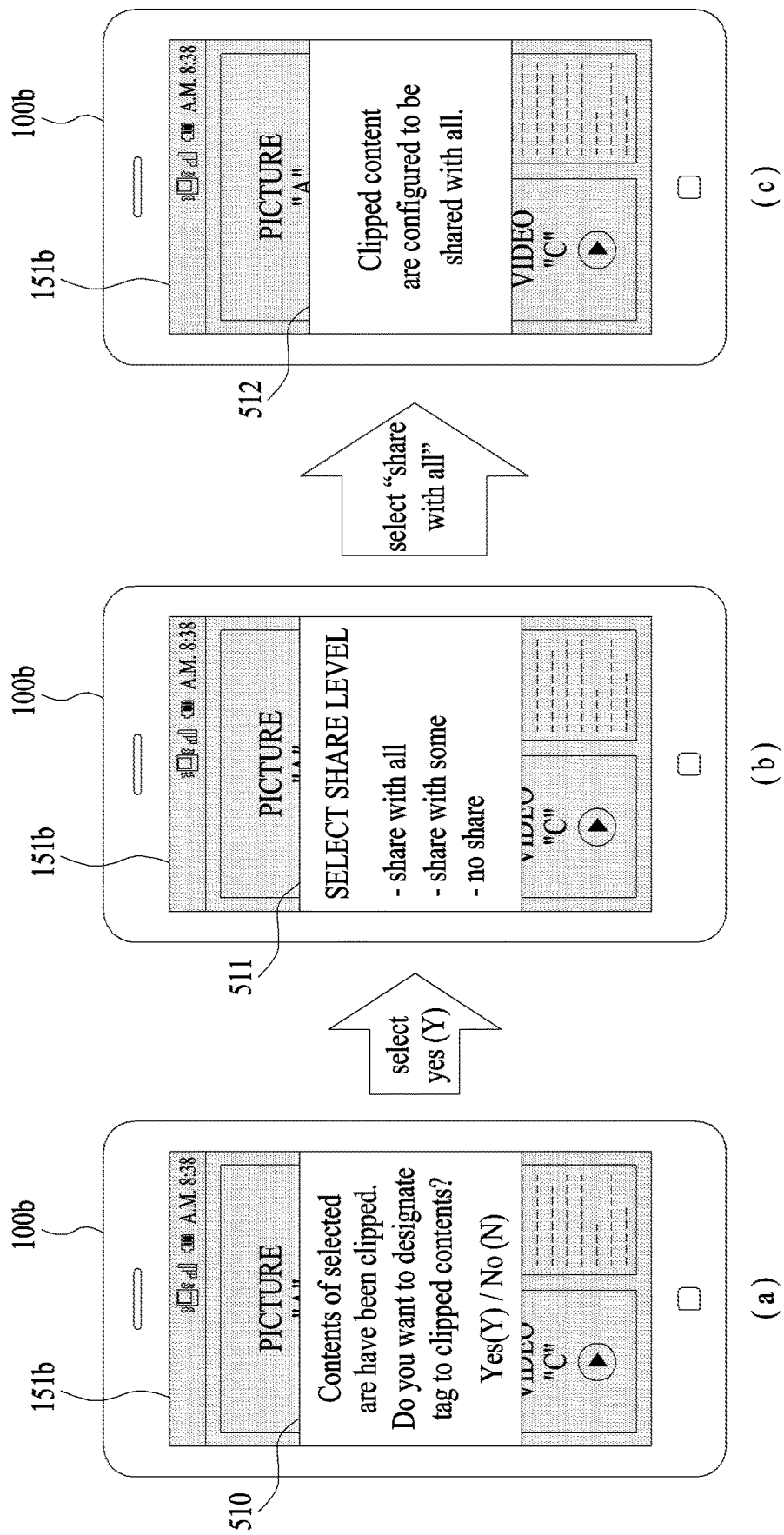

FIGS. 5a to 5c are diagram for a method of designating contents to be shared and a method of setting tag information and a sharing level to the designated contents according to one embodiment of the present invention.

Referring to FIG. 5a (a), a second terminal 100b displays a plurality of contents 501A to 501D through a display 151b of the second terminal. For example, the second terminal 100b can display multimedia contents of various forms by executing a web browser application.

In the example shown in FIG. 5a, contents have various forms. First content 501A corresponds to image content, second content 501B and fourth content 501D correspond to text content and third content 501C corresponds to video content.

According to one embodiment of the present invention, if an input 10a for designating/selecting a partial area 502 of the display 151b is received, the second terminal 100b can output a pop-up window 503 asking whether to clip content of the selected area (refer to FIG. 5a (c)). If a command for clipping the content is received through the pop-up window 503, a controller 180b of the second terminal 100b can store the content corresponding to the designated area 502 as clipped content. In particular, the controller 180b can store the content corresponding to the designated area 502, i.e., third content 501C and fourth content 501D, in a memory 160b of the second terminal 100b. According to one embodiment of the present invention, the third content 501C and the fourth content 501D can be stored as a clipped data 500.

As mentioned in the foregoing description, when content is stored as clipped content, it may indicate that a user separately stores the content to read the content again (although the user does not read an identical web page, the user is able to read the clipped content). According to one embodiment of the present invention, the content corresponding to the designated area 502 may correspond to content included in the designated area 502 (content displayed in the designated area).

A method of designating an area shall be explained in detail later with reference to FIG. 6.

Meanwhile, as shown in FIG. 5a (c), the content corresponding to the designated area 502 can be immediately stored as clipped content without a step of outputting the pop-up window 503.

FIG. 5b shows a method of setting a tag to stored clipped content. As shown in FIG. 5b (a), if the clipped content is stored, the controller 180b informs a user that content of a selected area has been clipped and may be then able to output a pop-up window 506 to ask whether to set a tag.

A tag is a sort of metadata stored with content used for searching for the content. When a user designates a specific tag to store a plurality of contents, if search is performed using the specific tag, a plurality of the contents to which the specific tag is designated can be outputted as a search result.

A command for designating a tag (e.g., yes in FIG. 5b (a)) is received, the controller 180b can output a pop-up window 507 for selecting a tag. In an example shown in FIG. 5b (b), the pop-up window 507 includes "BABY", "TRAVEL", "ADUCATION", and "CREATE NEW TAG" as a type of a tag. The "CREATE NEW TAG" may correspond to an item for storing a tag item not existing in the current pop-up window 507.

If a tag is selected from the pop-up window 507, the controller 180b can designate the selected tag to clipped content.

If the "CREATE NEW TAG" item is selected, the controller 180b can output a pop-up window 508 for receiving a new tag input and a virtual keypad 509. Subsequently, the second terminal 100b receives a new tag input based on a typing input inputted through the virtual keypad 509 and may be able to designate the inputted new tag to clipped content.

FIG. 5c is a diagram for a method of designating a sharing level to stored clip content according to one embodiment of the present invention. As shown in FIG. 5c (a), if clipped content is stored, the controller 180b can output a pop-up window 510 asking whether to set a sharing level to the content while informing a user that content of a selected area has been clipped.

The sharing level may correspond to a step of configuring the clipped content to be shared with other terminals, a step of configuring the clipped content not to be shared with other terminals or a step of configuring the clipped content to be shared with a partial terminal only.

If a command for designating a sharing level (e.g., yes in FIG. 5c (a)) is received, the controller 180b can output a pop-up window 507 for selecting a tag. A pop-up window 511 shown in an example of FIG. 5c (b) can include "share with all", "share with some", and "not share" as types of the sharing level.

If a sharing level item is selected from the pop-up window 511, the controller 180b can configure clipped content with the selected sharing level item. The controller can control the display 151b to output a guide pop-up window 512 to guide the configured sharing level.

In the foregoing description, the method of designating content to be clipped and the method of designating a tag and a sharing level have been explained. In the following, a method of designating a prescribed area 502 to designate content is explained with reference to FIG. 6.

Figure 6:
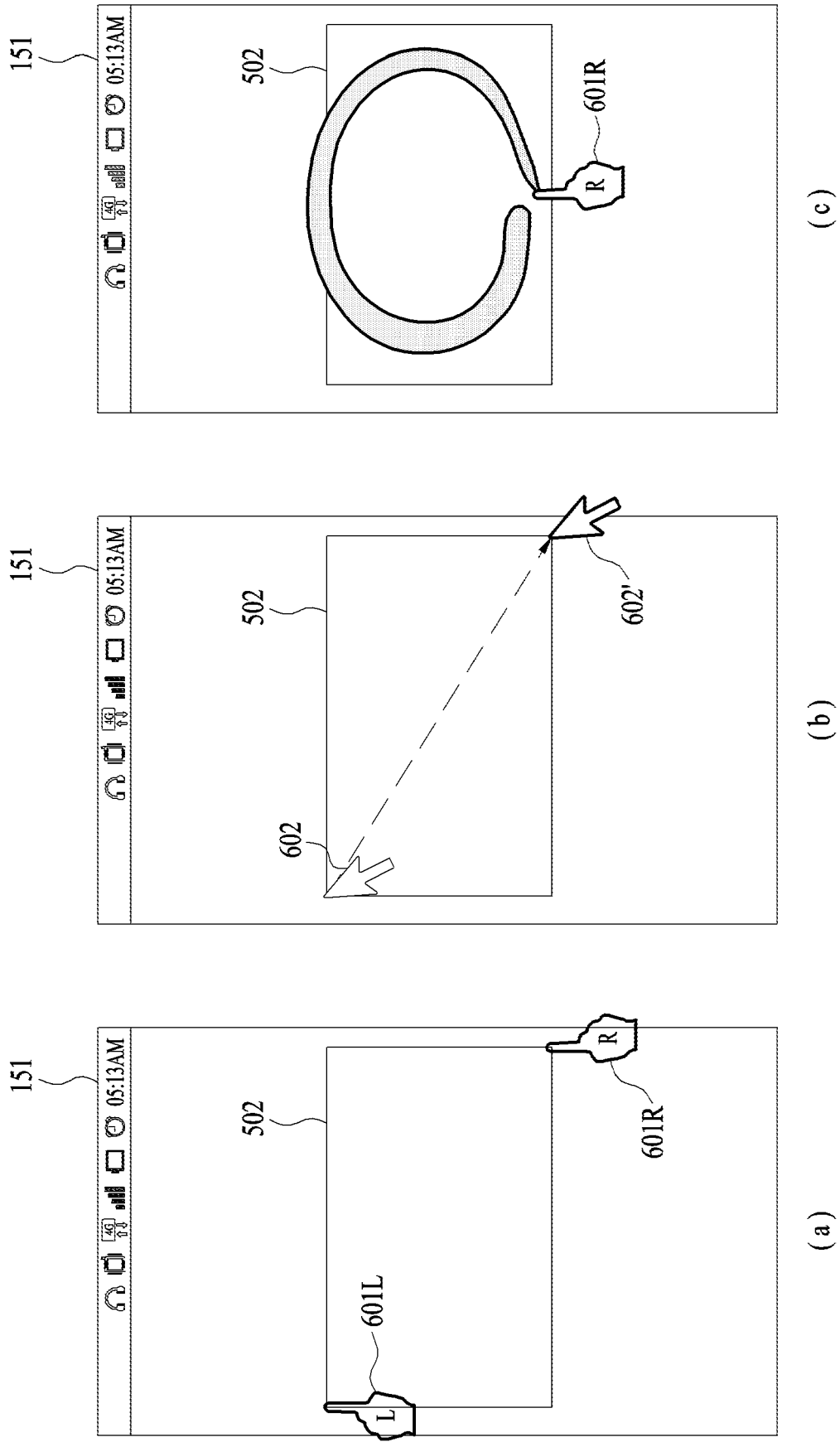
FIG. 6 is a diagram for examples of a method of designating a prescribed area to designate contents to be clipped according to one embodiment of the present invention.

FIG. 6 is a diagram for examples of a method of designating a prescribed area to designate contents to be clipped according to one embodiment of the present invention.

In FIGS. 6 (a) to (c), states of a display 151 of a terminal 100 are displayed only while exterior of the terminal 100 is omitted.

Referring to FIG. 6 (*a*), if a first point and a second point are touched, the controller 180 can configure a prescribed area 502 based on the touched first point and the second point. In this case, assume that the display 151 is implemented by a touch screen. The prescribed area 502 may correspond to a rectangular area including a diagonal line that connects the first point and the second point.

Referring to FIG. 6 (*b*), if an input of a cursor 602 clicking the first point and then dragging the cursor to the second point is received, the controller 180 can configure the prescribed area 502 based on the first and the second point.

Referring to FIG. 6 (*c*), if a touch drag input of a prescribed pattern is received, the controller 180 can designate the prescribed area 502 on the basis of the prescribed pattern. In an example of FIG. 6 (*c*), the prescribed pattern may correspond to a pattern of drawing a circle using the touch drag. In particular, if the touch drag of a user corresponds to a pattern of drawing a circle on a touch screen, the controller 180 can clip contents displayed in an area designated by the pattern.

In the foregoing description, the method of designating content and the method of setting tag information and a sharing level to the designated clip content have been explained with reference to FIGS. 5*a* to 6.

In the following, a controlling method capable of reading clipped contents at the same time in each of a plurality of terminals is explained.

FIGS. 7*a* to 7*f* are diagrams for a method of reading clipped contents in a first terminal 100*a* according to one embodiment of the present invention. The clipped contents can include not only contents clipped in the first terminal 100*a* but also contents clipped in other terminals 100*b* to 100*d*.

Figure 7A:
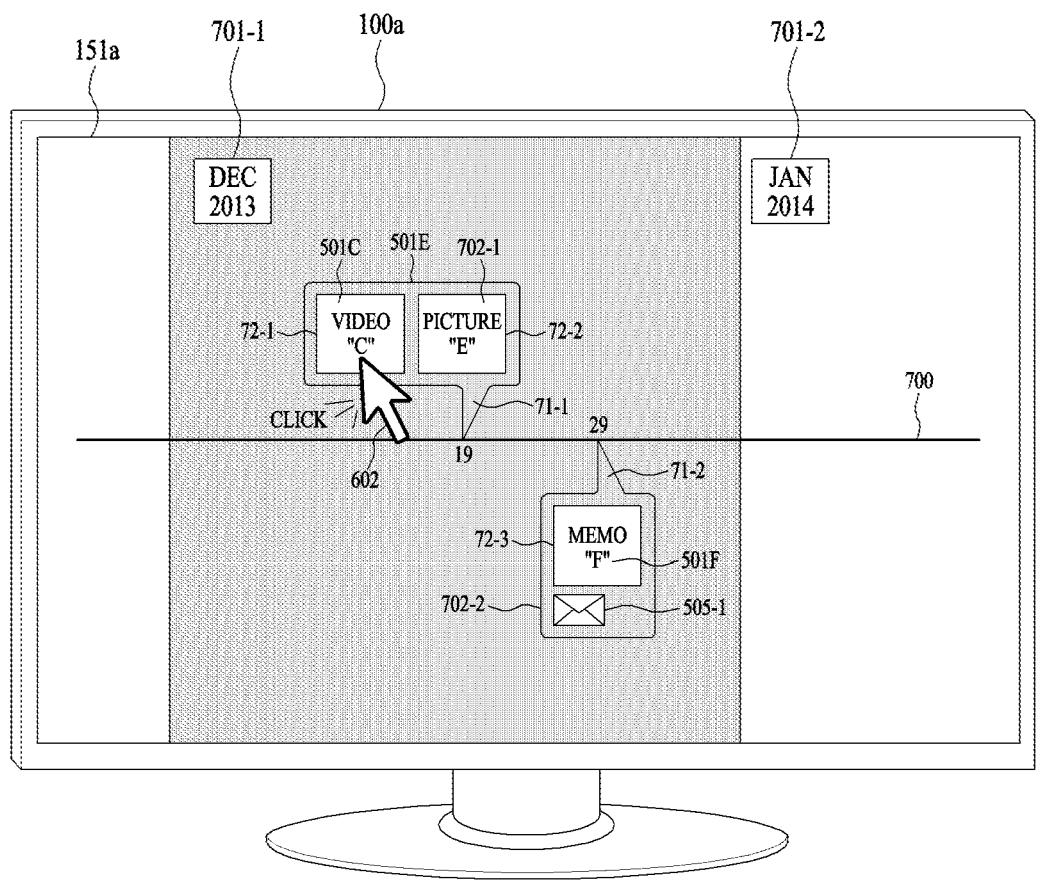
FIGS. 7a to 7f are diagrams for a method of reading clipped contents in a first terminal 100a according to one embodiment of the present invention.

Referring to FIG. 7*a*, the first terminal 100*a* displays a reading screen of clipped contents through a display 151*a* of the first terminal. The reading screen of the clipped contents includes a time axis 700. When the clipped contents are displayed, the time axis 700 corresponds to a reference line for aligning the clipped contents according to a clipped date. In the embodiments of the present invention, the time axis 700 can be displayed in various scales. A scale may correspond to a date interval per distance displayed on a screen. In particular, according to one embodiment of the present invention, the scale can be partly adjusted or adjusted in total based on a date of clipped content.

A method of adjusting a scale shall be explained in detail later with reference to FIGS. 7*e* and 7*f*.

The first terminal 100*a* can display a year/month indicator 701-1/701-2 in the reading screen of the clipped contents to indicate clipped year and month.

The first terminal 100*a* can display a first and a second preview thumbnail 72-1/72-2 of the clipped contents. If one clipped content includes both image content (video content) and text content, the controller 180*a* of the first terminal 100*a* omits a preview of the text content and may be able to display a preview of the image content (video content) only in a thumbnail form. In particular, as shown in FIG. 5*a*, although third content 501C and fourth content 501D are stored as one clipped content 500, the controller 180*a* of the first terminal reading the third content 501C and the fourth content 501D can control a first preview thumbnail 72-1 of the third content 501C corresponding to the video content to be displayed only.

The first and the second preview thumbnails 72-1/72-2 displayed through the display 151*a* may form a group on the basis of a clipped date. In particular, contents clipped on a same date can be displayed as a group. In an example of FIG. 7*a*, in case of displaying clipped contents, it is able to control the clipped contents to be displayed in chronological order and control a time axis and a date indicator 71-1/71-2 indicating dates on which the contents are clipped to be displayed on the time axis.

For example, assume that third content 501C to fifth content 501E are clipped on a same date, i.e., Dec. 19, 2013. In this case, the first terminal 100*a* can recognize the third to the fifth content as a group. Subsequently, the first terminal 100*a* displays a first and a second preview thumbnail 72-1/72-2 in a first speech balloon 702-1 in response to the third content 501C to the fifth content 501E, which are recognized as a group, and uses a tail part of the speech balloon as a first date indicator 71-1 to indicate a position of 19th day on the time axis.

As shown in FIG. 7*a*, the sixth content 501F indicates memo content. The memo content may correspond to text content made by a user using the terminal 100. The memo content can further output a reading indicator 505-1 indicating whether or not a user read the memo content. Although an example of the reading indicator 505-1 shown in FIG. 7*a* has a shape of an unopened envelop and if a user reads the memo content, the reading indicator may have a shape of an opened envelop to differently indicate whether or not the user reads the memo content.

The sixth content 501F is included in a second speech balloon 702-2. Since a second date indicator 71-2 corresponding to a tail part of the second speech balloon 702-2 indicates 29th day, it is able to know that the sixth content 501F is made on Dec. 29, 2013.

A reading method/state for each of the third content 501C and the sixth content 501F is explained with reference to FIG. 7*b* and FIG. 7*c*, respectively.

Figure 7B:
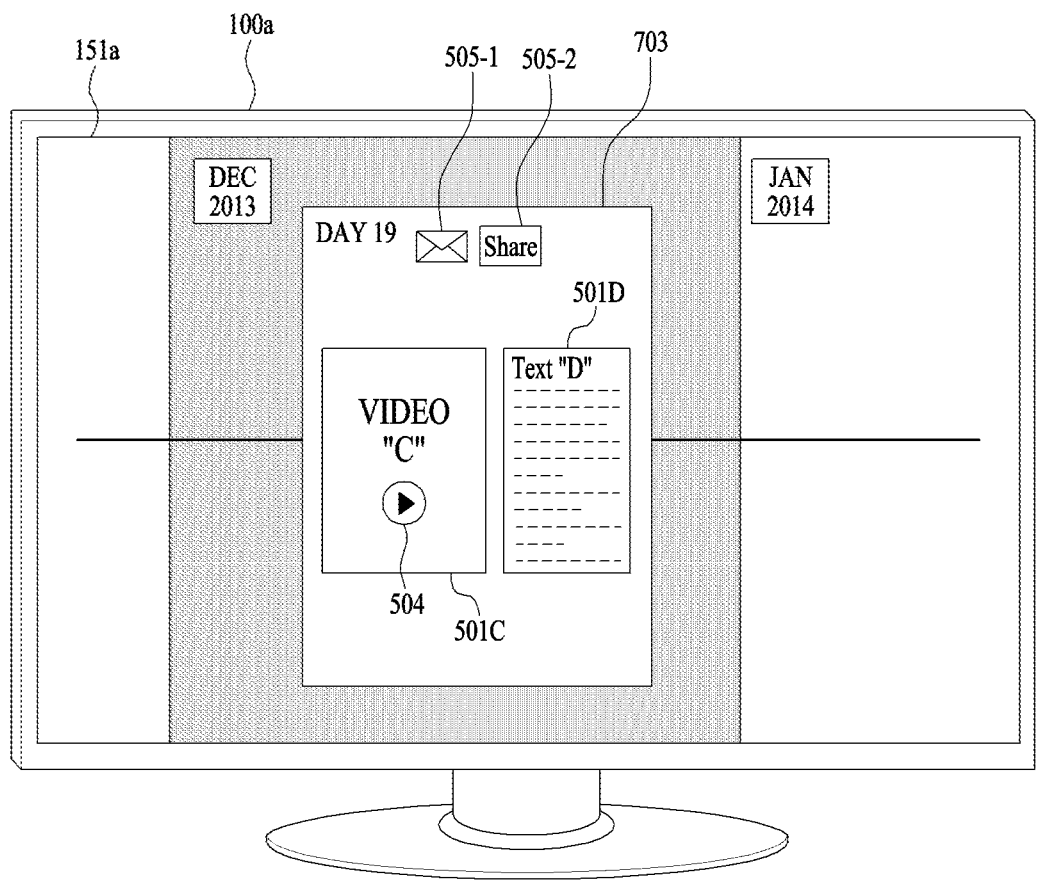

FIG. 7*b* is a diagram for a state of a reading screen of the third content 501C and the fourth content 501D. If an input for selecting a first preview thumbnail 72-1 is received, the controller 180*a* can output a pop-up window 703 displaying the third content 501C and the fourth content 501D. In an example shown in FIG. 7*a*, the input for selecting the first preview thumbnail 72-1 may correspond to an input that clicks the first preview thumbnail 72-1 using a cursor 602.

It is able to display a date on which content is clipped, a reading indicator 505-1 indicating whether or not a user read the content, and a share icon 505-2 in an area of the pop-up window 703. If the share icon 505-2 is selected, the controller 180*a* can control the clipped content displayed on the screen to be shared with a different terminal.

Figure 7C:
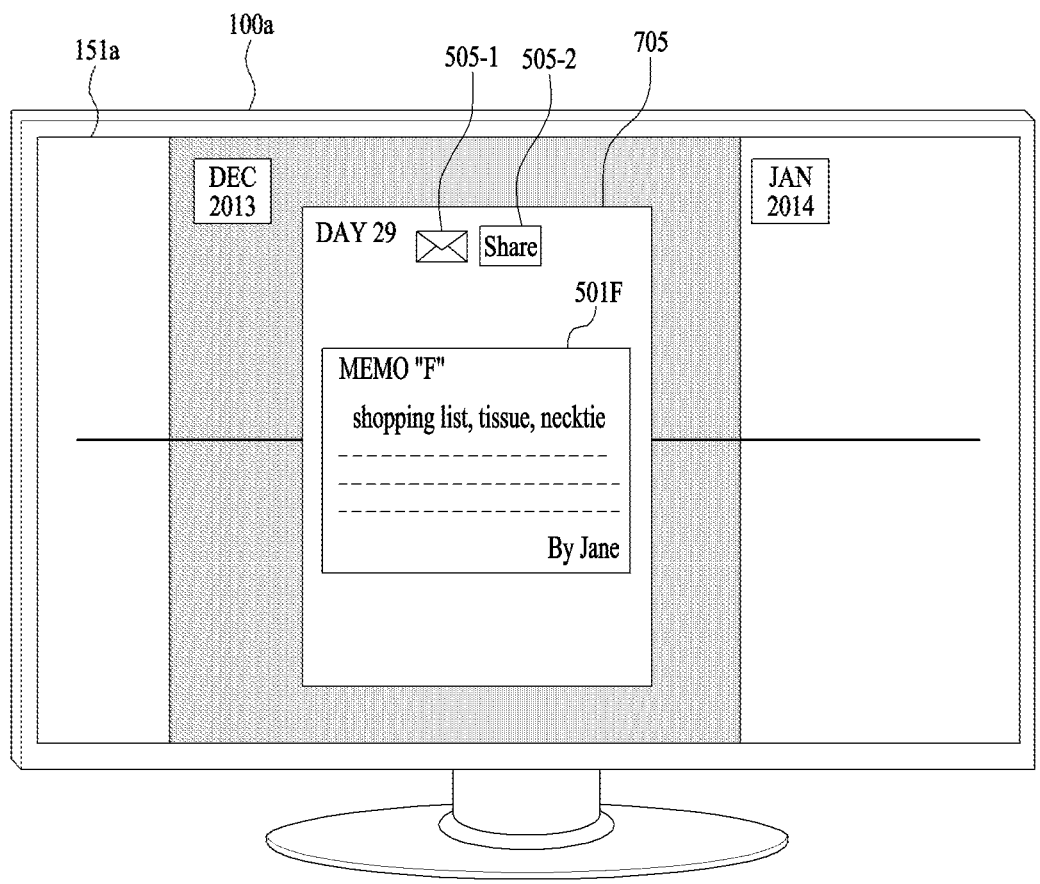

FIG. 7*c* is a diagram for a state of a reading screen of 6th content 501F. If an input for selecting a third preview thumbnail 72-3 is received, the controller 180*a* can output a pop-up window 705 in which the sixth content 501F is displayed. In an example shown in FIG. 7*a*, the input for selecting the third preview thumbnail 72-3 may correspond to an input that clicks the third preview thumbnail 72-3 using a cursor 602.

Assume that the sixth content 501F corresponds to memo content made by a different terminal 100*b* (a terminal registered as "Jane"). In particular, if memo content to be shared with a different terminal is made and the memo content is stored in the server 400, "jane" corresponding to a user of a second terminal 100*b* can read the memo content through the first terminal 100*a*.

Similar to the state of FIG. 7*b*, it is able to display a date on which content is clipped, a reading indicator 505-1 indicating whether or not a user read the content, and a share icon 505-2 in an area of the pop-up window 705. If the share icon 505-2 is selected, the controller 180a can control the clipped content displayed on the screen to be shared with a different terminal.

Figure 7D:
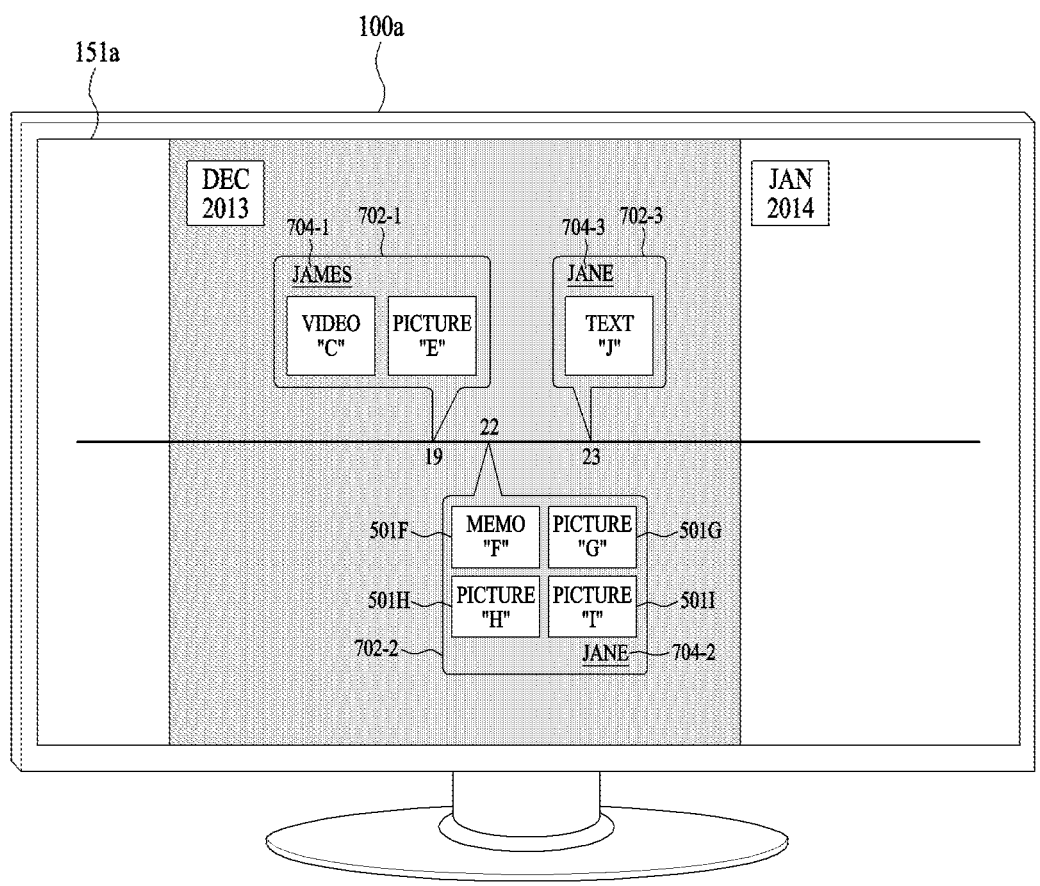

FIG. 7d is a diagram illustrating displaying contents shared by each of a plurality of terminals by identifying the contents when the shared contents are reading.

In an example related to embodiments of FIG. 7d, assume that a user of a second terminal 100b and a user of a third terminal 100c are registered as "Jane" and "James", respectively.

According to one embodiment of the present invention, as shown in FIG. 7d, in a state of reading clipped contents, it may be able to further display a registration indicator 704-1/704-2 to identify a terminal at which the clipped content is registered.

Referring to FIG. 7d, first to third speech balloon 702-1 to 702-3 are displayed together with a time axis 700. Sixth to ninth content 501F to 501I are included in the second speech balloon 702-2. Tenth content 501J is included in the third speech balloon 702-3.

Assume that the first speech balloon 702-1 corresponds to clipped contents shared by the third terminal 100c corresponding to a terminal registered as "James" and the second speech balloon 702-2 and the third speech balloon 702-3 correspond to clipped contents shared by the second terminal 100b. The controller 180 can display a registration indicator 704-1 in an area of the first speech balloon 702-1 and the registration indicator 704-1 may indicate contents registered by the third terminal 100c.

Meanwhile, one embodiment of the present invention proposes to adjust a scale of the time axis 700 displayed in FIG. 7a to FIG. 7d. This is because, if a clipping operation is performed on many contents for a short time period, it is necessary to reduce the scale of the time axis 700 to densely display the many contents on a screen. On the contrary, if a clipping operation is not frequently performed on contents for a long time, it is necessary to increase the scale of the time axis to widen an interval between the displayed contents.

The scale adjustment is explained in the following in a manner of comparing the states shown in FIG. 7e and FIG. 7f with each other.

Figure 7E:
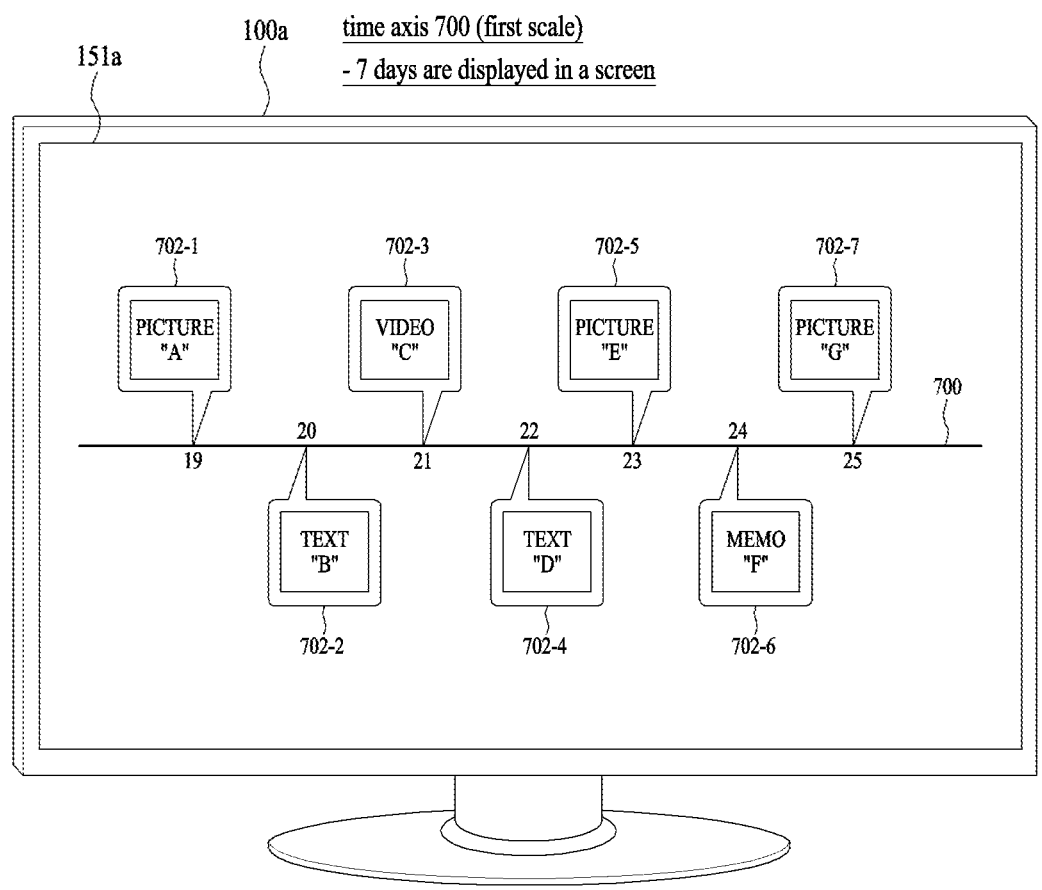
Figure 7F:
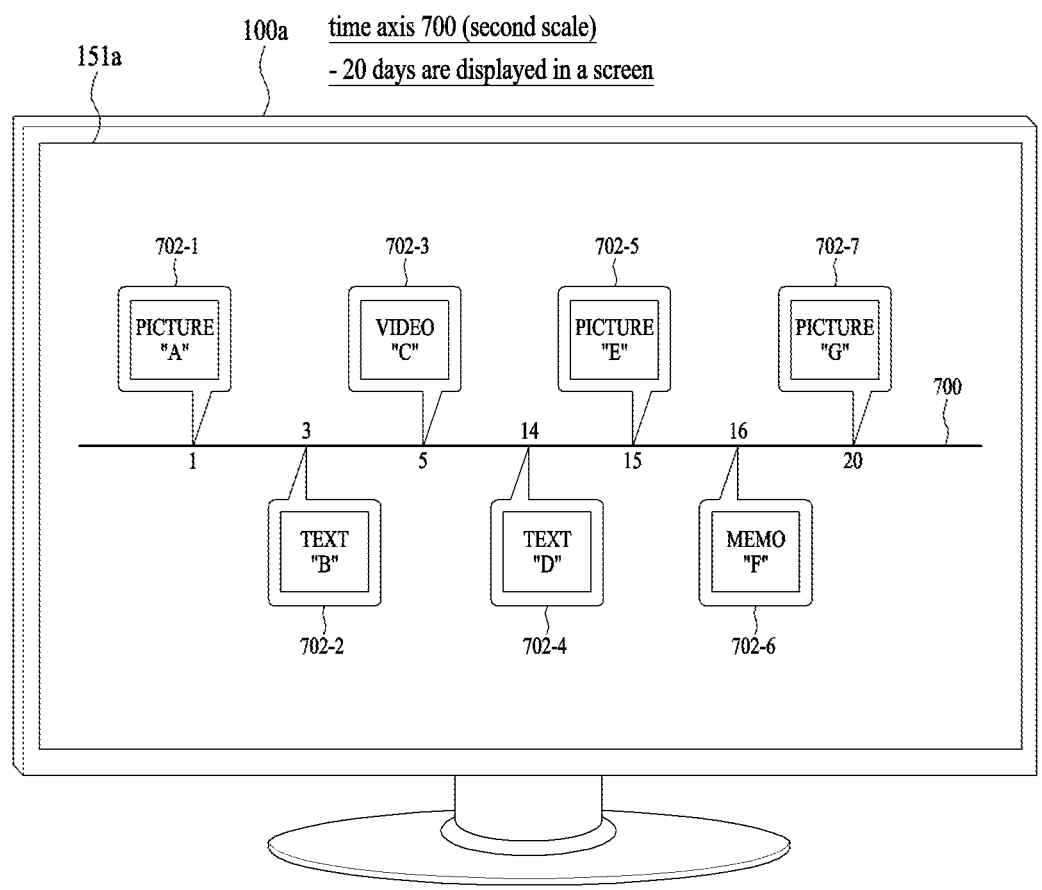

In the states shown in FIG. 7e and FIG. 7f, a terminal 100a displays a time axis 700 and first speech balloon 702-1 to seventh speech balloon 702-7. In this case, assume that each speech balloon includes clipped content.

Referring to FIG. 7e, dates on which contents are clipped, which are included in the first speech balloon 702-1 to the seventh speech balloon 702-7, are distributed from 19th day to 25th day. On the contrary, referring to FIG. 7f, dates on which contents are clipped, which are included in the first speech balloon 702-1 to the seventh speech balloon 702-7, are distributed from 1st day to 20th day. In particular, referring to FIG. 7e, it is able to see that dates on which the contents are clipped are more densely distributed between the first speech balloon 702-1 and the seventh speech balloon 702-7 and it is able to see that dates on which the contents are clipped are more widely distributed between the first speech balloon 702-1 and the seventh speech balloon 702-7 in FIG. 7f.

The controller 180 can control the scale for displaying the time axis 700 to be adjusted based on distribution of the dates on which the displayed contents are clipped. If the number of clipped contents displayed on a screen is limited to 7, the scale can be adjusted to make an interval between date on which content is most recently clipped and date on which content is firstly clipped correspond to a total screen length.

Hence, referring to FIG. 7e, since the firstly clipped first speech balloon 702-1 indicates 19th day and the most recently clipped seventh speech balloon 702-7 indicates 25th day, a first scale is determined on the basis of 7 days corresponding to an interval between the two dates and the time axis 700 can be adjusted and displayed based on the first scale.

Similarly, referring to FIG. 7f, since the firstly clipped first speech balloon 702-1 indicates 1st day and the most recently clipped seventh speech balloon 702-7 indicates 20th day, a second scale is determined on the basis of 20 days corresponding to an interval between the two dates and the time axis 700 can be adjusted and displayed based on the second scale.

Meanwhile, according to the embodiment mentioned earlier with reference to FIG. 7b, a tag is designated while contents are clipped. In the following, an embodiment of searching for contents using a tag is explained with reference to FIG. 8a and FIG. 8b.

Figure 8A:
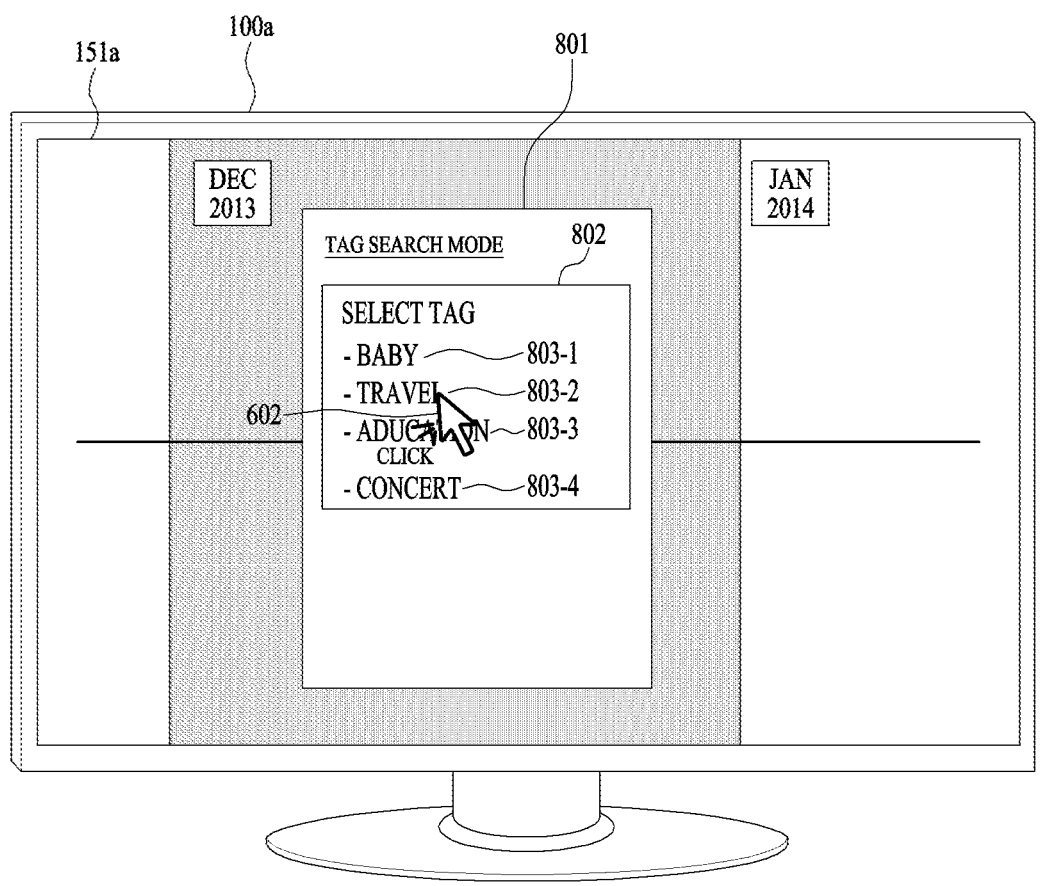
FIGS. 8a and 8b are diagrams for an example of a method of searching for clipped contents using a designated tag according to one embodiment of the present invention.
Figure 8B:
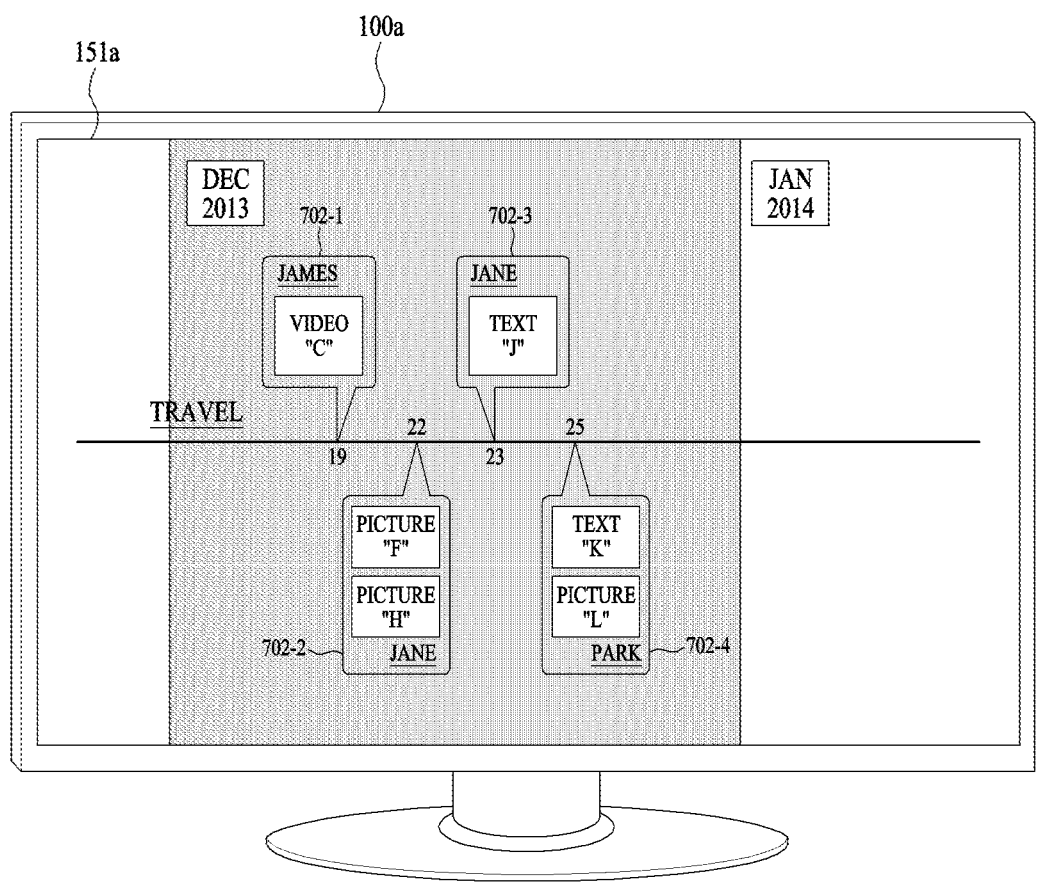

FIGS. 8a and 8b are diagrams for an example of a method of searching for clipped contents using a designated tag according to one embodiment of the present invention.

If a command for entering a tag search mode is received, the controller 180a can output a pop-up window 801 for selecting a tag. The pop-up window 801 can include a tag list 802 and the tag list 802 may correspond to a list of tags designated to currently clipped contents. Referring to FIG. 8a, the tag list 802 includes first to fourth tag item 803-1 to 803-4.

If an input for selecting a tag from the tag list 802 is received, the controller 180a searches for clipped contents using the selected tag.

In an example shown in FIG. 8a, assume that a "Travel" item corresponding to a second tag item 803-2 is selected. The controller 180a searches for clipped contents using the selected second tag item 803-2 and may be then able to output searched (filtered) results as shown in FIG. 8b.

Referring to FIG. 8b, clipped contents to which "Travel" tag is designated are displayed only. First speech balloon 702-1 includes third content 501C. Second speech balloon 702-2 includes sixth content 501F and eighth content 501H. Third speech balloon 702-3 includes tenth content 501J. And, fourth speech balloon 702-4 includes eleventh content 501K and twelfth content SOIL.

In particular, in FIG. 8b, the third content 501C, the sixth content 501F, the eighth content 501H, the tenth content 501J, the eleventh content 501K and the twelfth content SOIL displayed on a search screen are contents to which the "Travel" tag is designated.

If clipped contents are searched or filtered using a tag, since contents to which the selected tag is designated are displayed only, the number of previously displayed clipped contents is reduced. Hence, one embodiment of the present invention proposes that the controller 180a adjusts a scale of a time axis 700 according to a filtering result when clipped contents are filtered.

In particular, the time axis 700, which is displayed in a first scale before the clipped contents are filtered, can be displayed in a second scale after the clipped contents are filtered. As mentioned earlier with reference to FIG. 7e and FIG. 7f, the second scale can be determined on the basis of a date on which the displayed contents are clipped.

Meanwhile, if clipped content itself includes a prescribed date, one embodiment of the present invention proposes that the prescribed date is automatically recognized and the recognized prescribed date is to be displayed by an indicator (display a date notification indicator). For example, when a user clips news related to a concert of a band preferred by the user, if a concert date is included in the news, the concert date can be guided (indicated). Regarding this embodiment, it is explained in the following with reference to FIGS. 9a to 9d.

FIGS. 9a to 9d are diagrams for a method of recognizing a date included in clipped contents and informing a user of the recognized date according to one embodiment of the present invention.

Figure 9A:
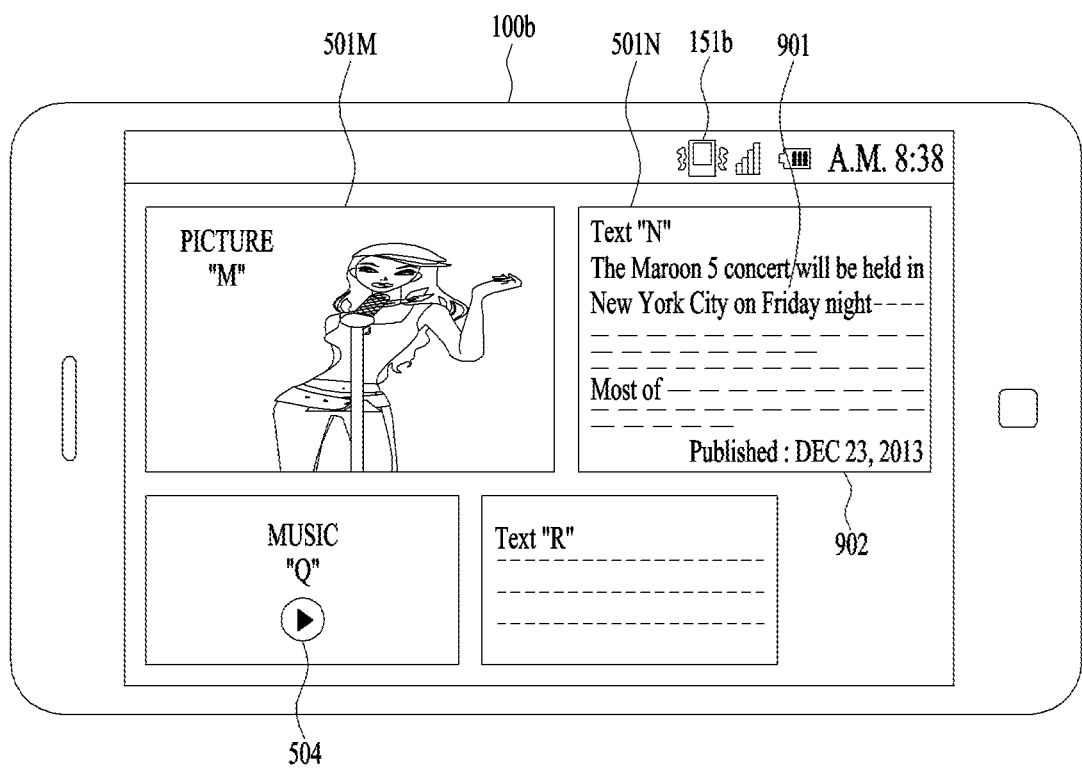
FIGS. 9a to 9d are diagrams for a method of recognizing a date included in clipped contents and informing a user of the recognized date according to one embodiment of the present invention.
Figure 9B:
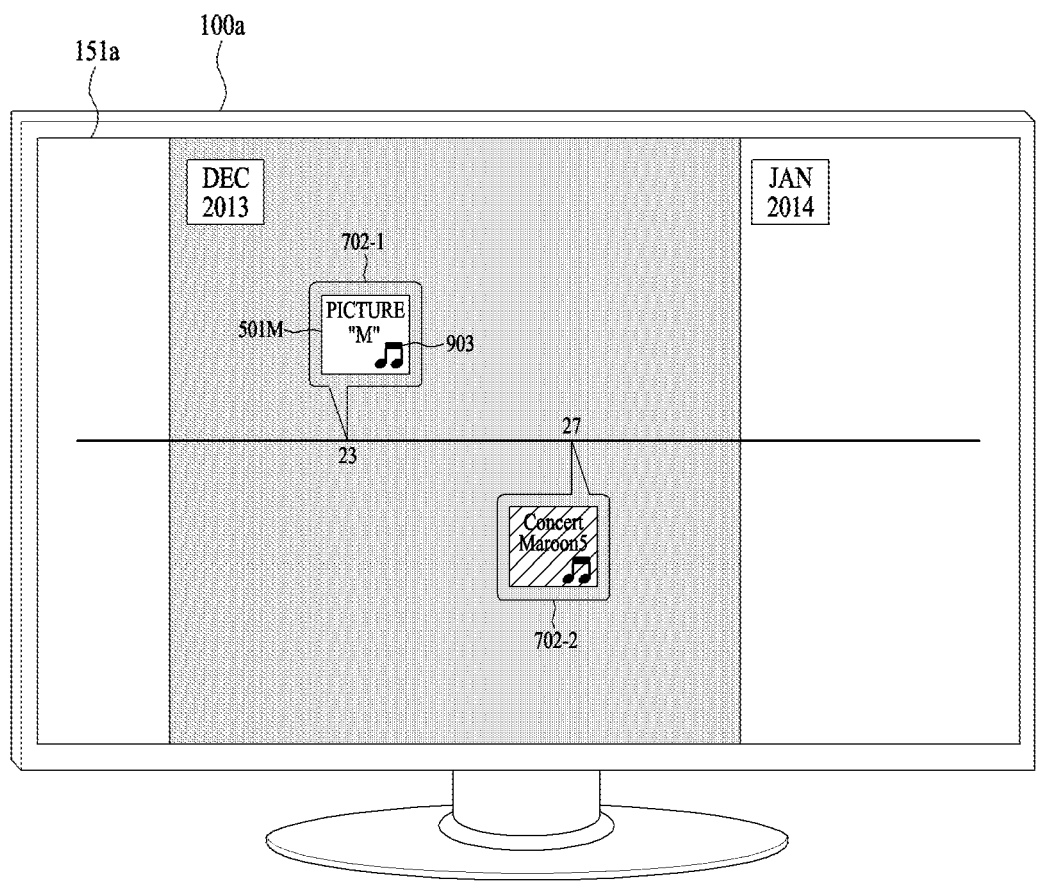

FIG. 9a is a diagram for contents clipped through a second terminal 100b. Referring to FIG. 9b, the second terminal 100b outputs a plurality of contents including thirteenth content 501M and fourteenth content 501N through a display 151b of the second terminal.

Assume that the thirteenth content 501M corresponds to image content and an image of a news article. Assume that the fourteenth content 501N corresponds to text content and a news article corresponding to the thirteenth content 501M. And, the fourteenth content 501N includes prescribed concert information, i.e., information on a date 901 on which a prescribed concert is to be held.

In FIG. 9a, although the information on a date 901 includes information such as Friday only, it is apparent that it is able to specify a prescribed date (27th day) in a manner of being combined with a date 902 on which the news article is published.

The controller 180b recognizes the information on a date 901 and may be able to store a recognized date together with the clipped content. In this case, when a user reads the clipped content, a terminal can further display a date notification indicator for the user using the recognized date. A state of outputting a guide indicator is explained in the following with reference to FIG. 9b.

FIG. 9b is a diagram for a method of recognizing a prescribed date included in clipped content and displaying a date notification indicator based on the recognized date. As mentioned earlier in the example of FIG. 9a, the thirteenth content 501M and the fourteenth content 501N shared via the second terminal 100b are displayed through the display 151a of the first terminal 100a (FIG. 9b).

If a date on which the thirteenth content 501M and the fourteenth content 501N are clipped corresponds to a 23rd day, as shown in FIG. 9b, a tail of a first speech balloon 702-1 including the thirteenth content 501M and the fourteenth content 501N may indicate the 23rd day.

The controller 180a of the first terminal 100a can control a date notification indicator 702-2 to be displayed on a prescribed date recognized by the fourteenth content 501N in FIG. 9a. In the example shown in FIG. 9b, the date notification indicator is displayed using a speech balloon form.

In particular, when prescribed content is clipped, one embodiment of the present invention proposes that a date included in the prescribed content is automatically recognized and the prescribed date is informed to a user as a notification.

In the examples mentioned earlier in FIG. 9a and FIG. 9b, although a concert date included in clipped content is recognized and the date is provided to a user, by which the present invention may be non-limited.

As a different example, when content including a specific person is clipped, birthday of the specific person or a date related to the specific person can be guided. For example, when content on such a movie star as "Brad Pitt" is clipped, the controller 180 can control birthday of the "Brad Pitt" to be automatically searched and control the searched birthday to be informed to a user. In case of informing the user of the birthday, as shown in an example of FIG. 9b, it may use a date notification indicator 702-2 of a speech balloon form on the time axis 700. Moreover, it may be able to search for a preview date of a recently released film and/or a release date of the recently released film in which "Brad Pitt" appears and may be able to further provide a guide for the searched date to the user.

Meanwhile, regarding a method of guiding a specific date, although the example mentioned earlier in FIG. 9b has proposed that the date notification indicator 702-2 is to be displayed on the time axis 700, by which the present invention may be non-limited. Various guiding methods are explained in the following with reference to FIG. 9c and FIG. 9d.

Figure 9C:
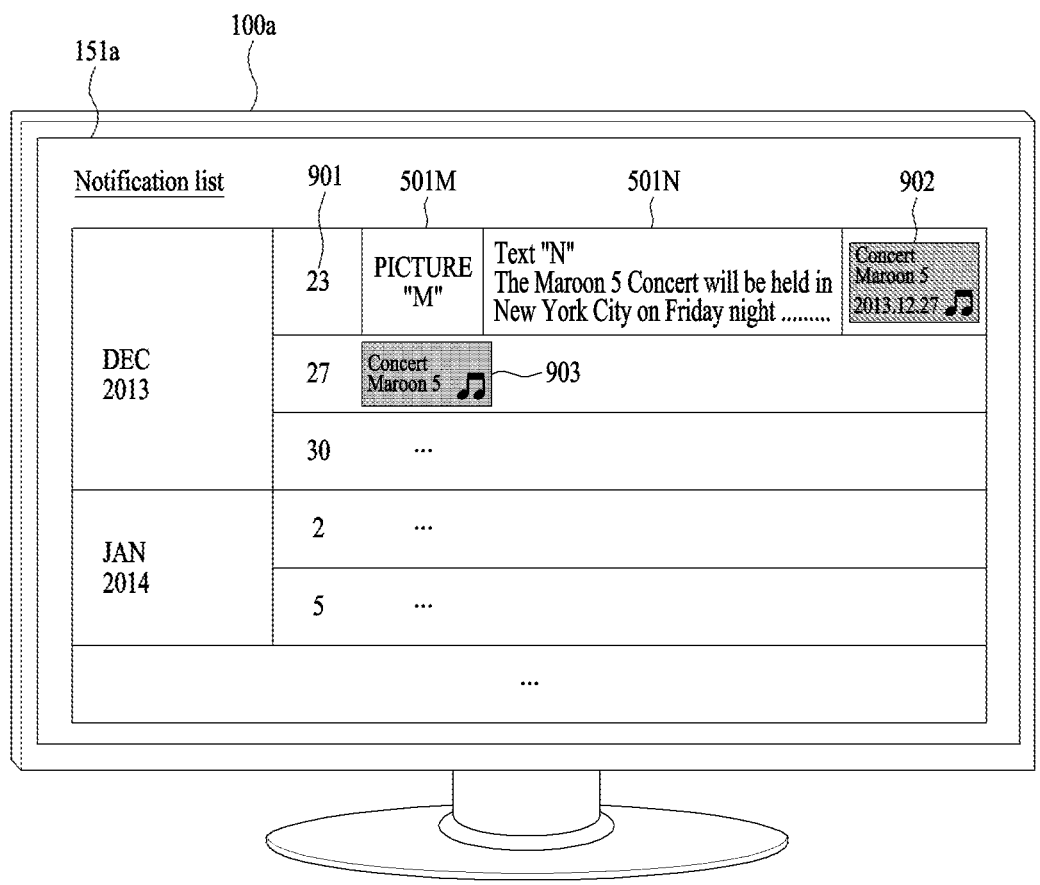

FIG. 9c is a diagram for a method of guiding a specific date together with tag information according to one embodiment of the present invention.

Referring to FIG. 9c, a first terminal 100a outputs a notification list for a specific date.

Thirteenth content 501M, fourteenth content 501N and a date 901 on which the contents are clipped are displayed on the first line of the list. Moreover, the first terminal 100a can further display a concert guide icon 902 to guide a concert date recognized from the fourteenth content 501N.

And, the first terminal 100a can separately output an item corresponding to the recognized concert date on the notification list. In particular, the embodiment of FIG. 9a proposes to display 27th day corresponding to the recognized concert date on the notification list as a separate item. And, the first terminal 100a can output a concert notification icon 903 through the separately outputted item (27th day item).

Referring to the embodiment of FIG. 9c, the first terminal 100a can provide a notification on an automatically recognized prescribed date to a user while displaying clipped contents.

Figure 9D:
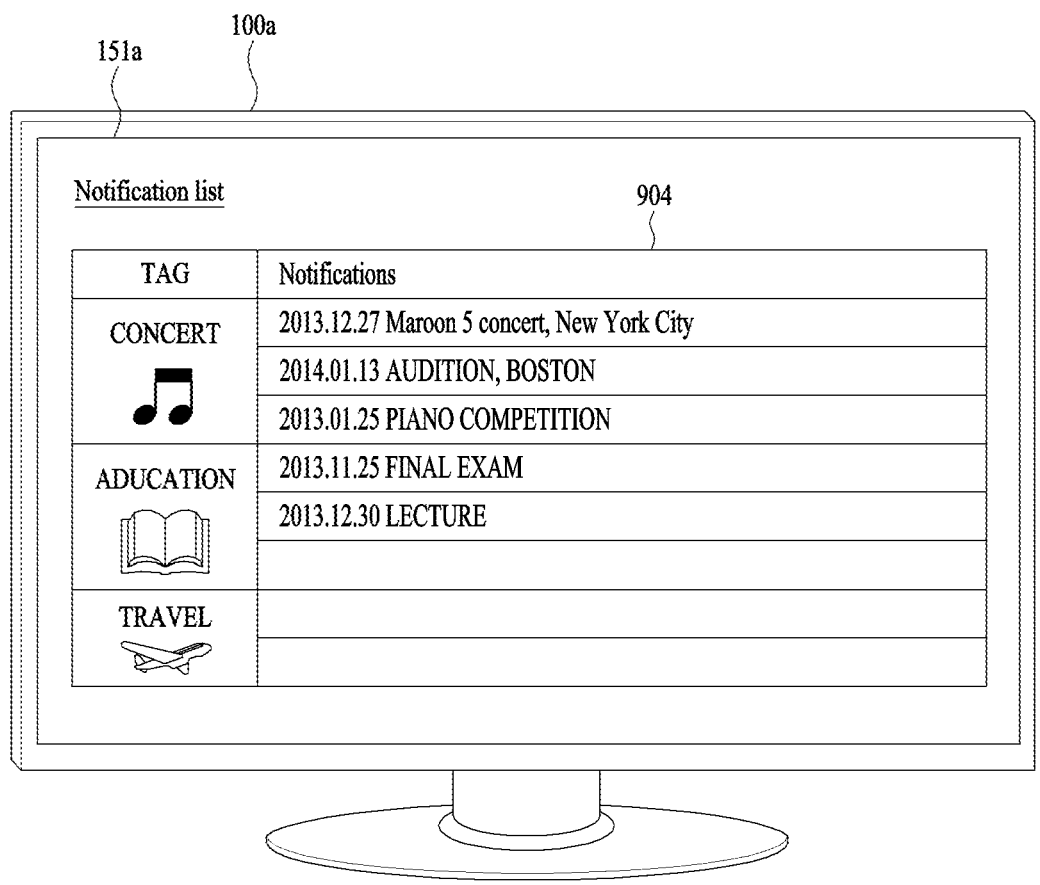

As shown in FIG. 9d, the aforementioned notification list can be displayed in a manner of being aligned according to a designated tag.

Referring to FIG. 9d, it shows tags including "CONCERT", "ADUCATION" and "TRAVEL", and a notification list is displayed according to each tag.

Hence, according to one embodiment of the present invention, it is able to automatically recognize a date included in clipped content and it is able to provide a user with a notification list in response to the recognized date in a simple list form (FIG. 9c) or a form aligned according to a tag (FIG. 9d).

Figure 10A:
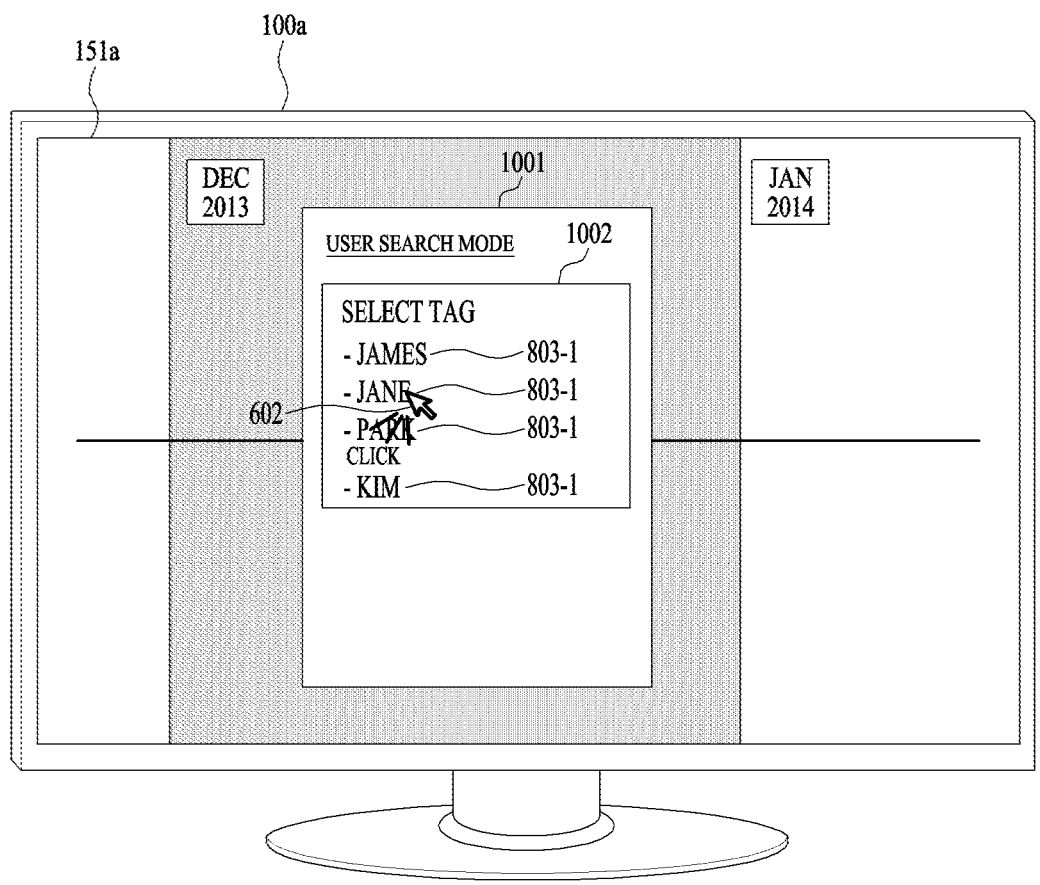
FIGS. 10a and 10b are diagrams for an example of a method of searching for clipped contents using a registered terminal user according to one embodiment of the present invention.
Figure 10B:
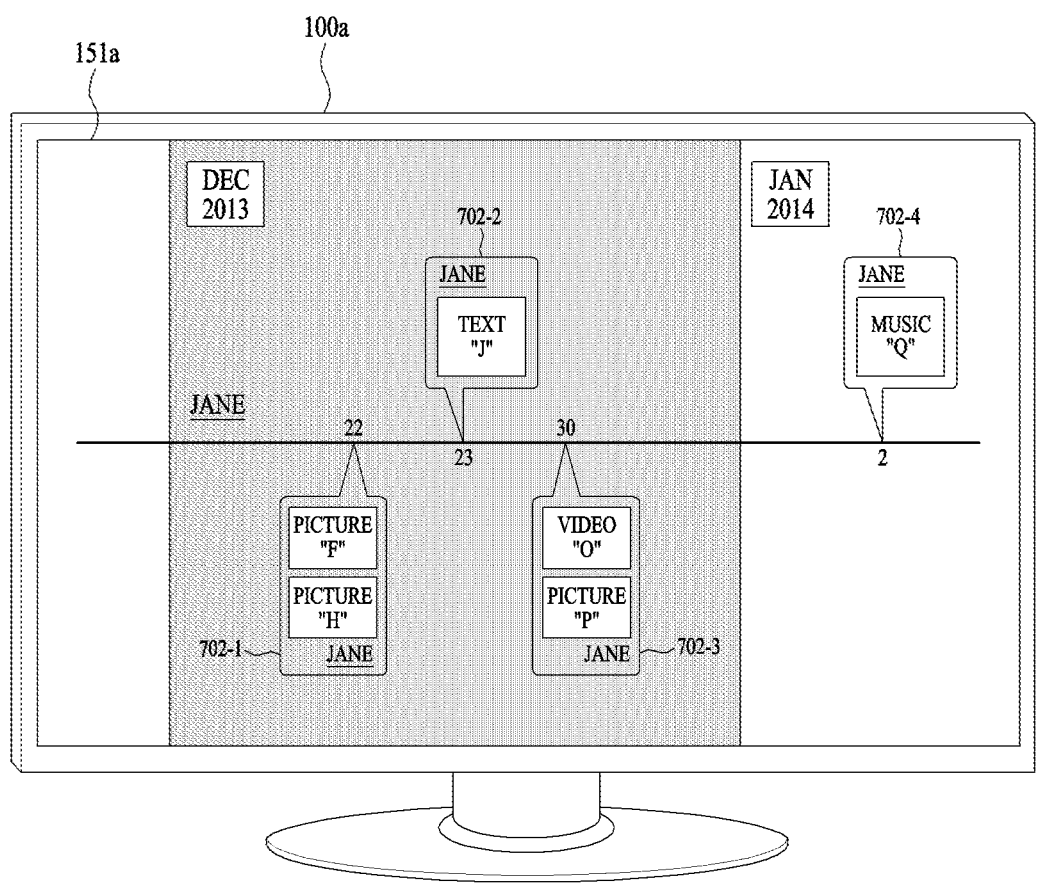

FIGS. 10a and 10b are diagrams for an example of a method of searching for clipped contents using a registered terminal user according to one embodiment of the present invention.

If a command for entering a user search mode is received, the controller 180a can output a pop-up window 1001 for selecting a user. The pop-up window 1001 can include a user list 1002. Referring to FIG. 10a, the user list 1002 includes a first to fourth user item 1003-1 to 1003-4.

If an input for selecting a user from the user list 1002 is received, the controller 180a searches for clipped contents using the selected user.

In an example shown in FIG. 10a, assume that the second user item 1003-2, i.e., "JANE" item, is selected. The controller 180a searches for clipped contents using the selected second user item 1003-2. As shown in FIG. 10b, the controller 180a can output a searched (filtered) result.

Referring to FIG. 10b, contents clipped (shared) by "JANE" user are displayed only. First speech balloon 702-1 includes sixth content 501F and eighth content 501H. Second speech balloon 702-2 includes tenth content 501J. Third speech balloon 702-3 includes fifteenth content 501O and sixteenth content 501P. Fourth speech balloon 702-4 includes seventeenth content 501Q.

In particular, in FIG. 10b, the sixth content 501F, the eighth content 501H, the tenth content 501J, the fifteenth content 501O, the sixteenth content 501P and the seventeenth content 501Q displayed on a search screen correspond to contents clipped by a terminal registered as "JANE".

If clipped contents are searched or filtered using a registered user, since contents clipped by a specific terminal are displayed only, the number of previously displayed clipped contents is reduced. Hence, similar to FIG. 8a and FIG. 8b, one embodiment of the present invention proposes that the controller 180a adjusts a scale of a time axis 700 according to a filtering result when clipped contents are filtered.

Meanwhile, as mentioned earlier in FIG. 7c, according to one embodiment of the present invention, it may be able to set a sharing level to clipped contents. An example of differently displaying clipped contents according to a sharing level set to the clipped contents is explained with reference to FIGS. 11a to 11c.

Figure 11A:
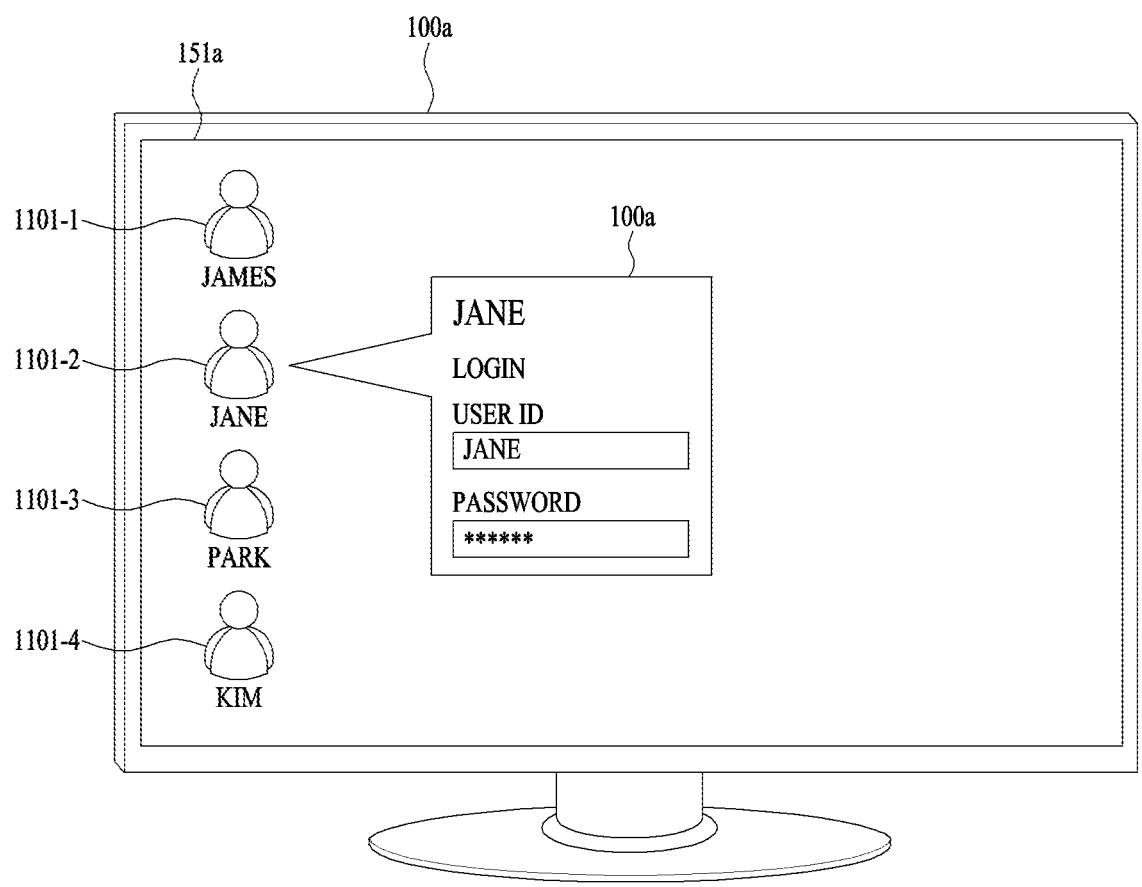
FIGS. 11a to 11c are diagrams for an example of a method of searching for clipped contents using a designated user according to one embodiment of the present invention.
Figure 11B:
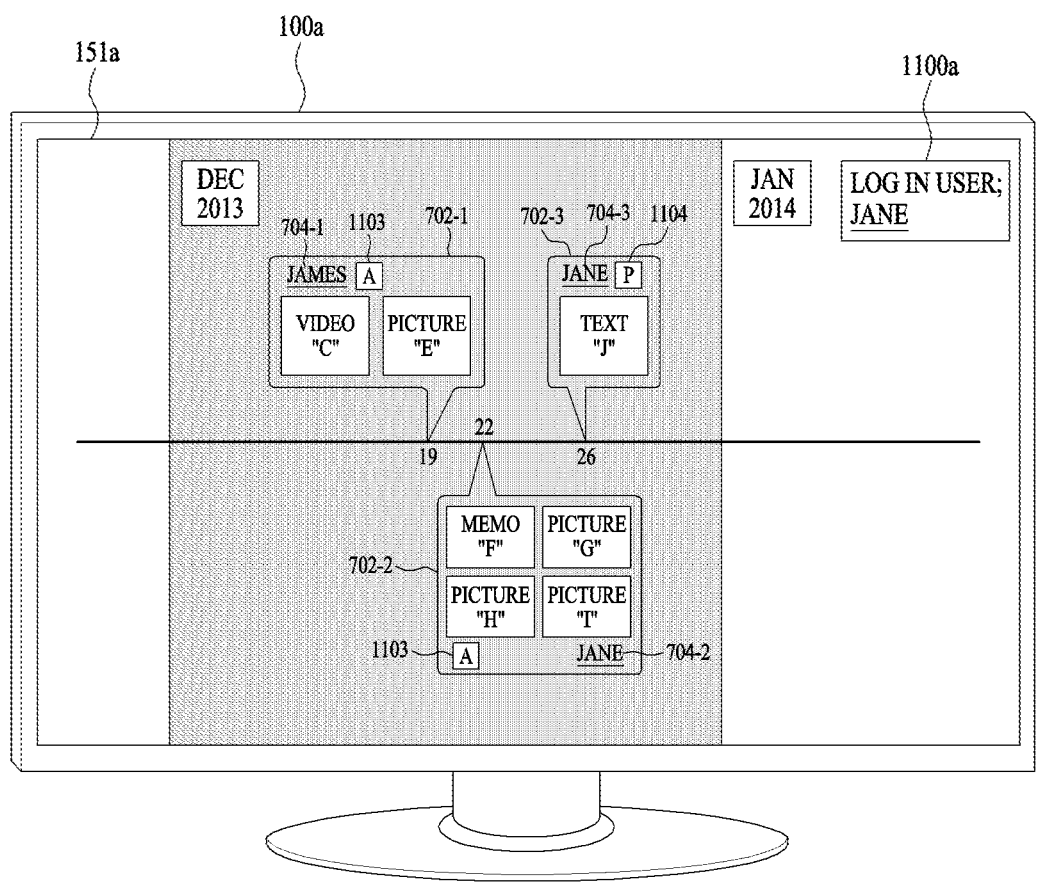
Figure 11C:
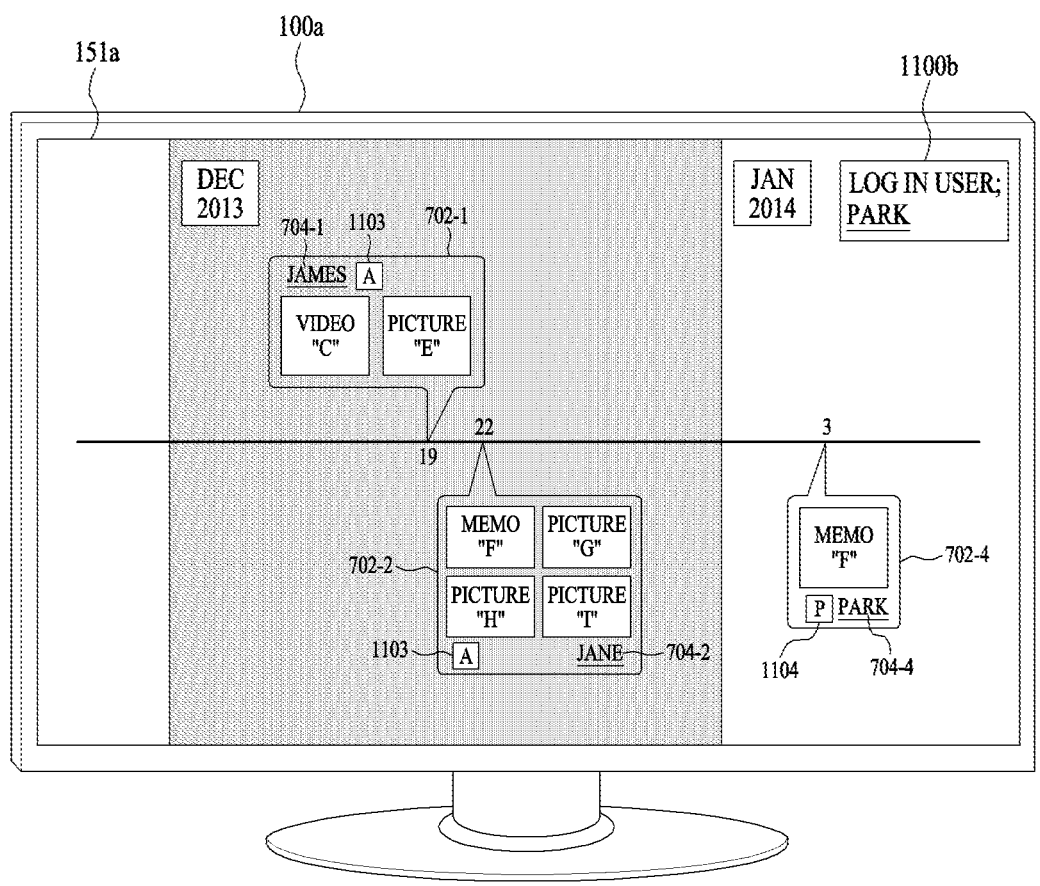

FIGS. 11a to 11c are diagrams for an example of a method of searching for clipped contents using a designated user according to one embodiment of the present invention.

FIG. 11a is a diagram for a state of a login screen for each of a plurality of users. Referring to the state of FIG. 11a, it shows a user list 1101-1 to 1101-4 registered at each of a plurality of terminals and a login pop-up window 1102 is displayed in respond to such a user as "JANE".

When an application (software) for reading clipped contents shared by a plurality of terminals is executed, one embodiment of the present invention proposes to identify a user by a login step. And, one embodiment of the present invention proposes to display contents shared by identified users in a manner of being distinguished from contents not shared by the identified users.

FIG. 11b shows a state of being logged in by a user such as "JANE". A user indicator 1100a indicates that the user "JANE" has logged in.

Referring to FIG. 11b, first speech balloon 702-1, third speech balloon 702-3 and clipped contents displayed in each speech balloon are displayed. Sharing level indicators 1103/1104 indicating sharing levels are respectively displayed in each speech balloon. The sharing level indicator 1103 includes "A" character to indicate all users and the sharing level indicator 1104 includes "P" character to indicate a partial user.

In particular, since the sharing level indicator 1103 is displayed in the first speech balloon 702-1 and the second speech balloon 702-2, it indicates that clipped contents included in the first speech balloon 702-1 and the second speech balloon 702-2 correspond to contents shared by all users. Since the sharing level indicator 1104 is displayed in the third speech balloon 702-3, it indicates that clipped contents included in the third speech balloon 702-3 correspond to contents shared by a designated partial terminal (a terminal at which a designated user is registered) only. In an example of FIG. 11b, assume that the contents included in the third speech balloon 702-3 correspond to contents shared by a terminal at which the user "JANE" is registered only.

Unlike FIG. 11b, FIG. 11c shows a state of being logged in by a user such as "PARK". Fourth speech balloon 702-4 is displayed instead of the third speech balloon 702-3. In particular, the contents included in the third speech balloon 702-3 are not displayed in a terminal at which the user "PARK" is registered according to a sharing level and a designated sharing target. On the contrary, although the fourth speech balloon 702-4 is not displayed in the state of being logged in by "JANE" according to a sharing configuration, the fourth speech balloon 702-4 can be displayed in FIG. 11c.

FIG. 12 is a flowchart for a method of designating prescribed content and sharing the designated content according to one embodiment of the present invention.

In the step S1201, the controller 180 can display at least one or more contents through the display 151.

In the step S1202, the controller 180 receives an input of designating a prescribed area 502 from a user. In this case, the input of designating the prescribed area 502 may correspond to an input of selecting a first point and dragging the first point to a second point [S1202-1]. As a different case, the input of designating the prescribed point 502 may correspond to an input of touching a second point while touching a first point of a touch screen [S1202-2]. As a further different case, the input of designating the prescribed point 502 may correspond to an input of forming a closed curve using a touch drag path [S1202-3].

In the step S1203, the controller 180 clips at least one or more contents corresponding to a designated area and can transmit the clipped contents to a server 400.

Figure 13:
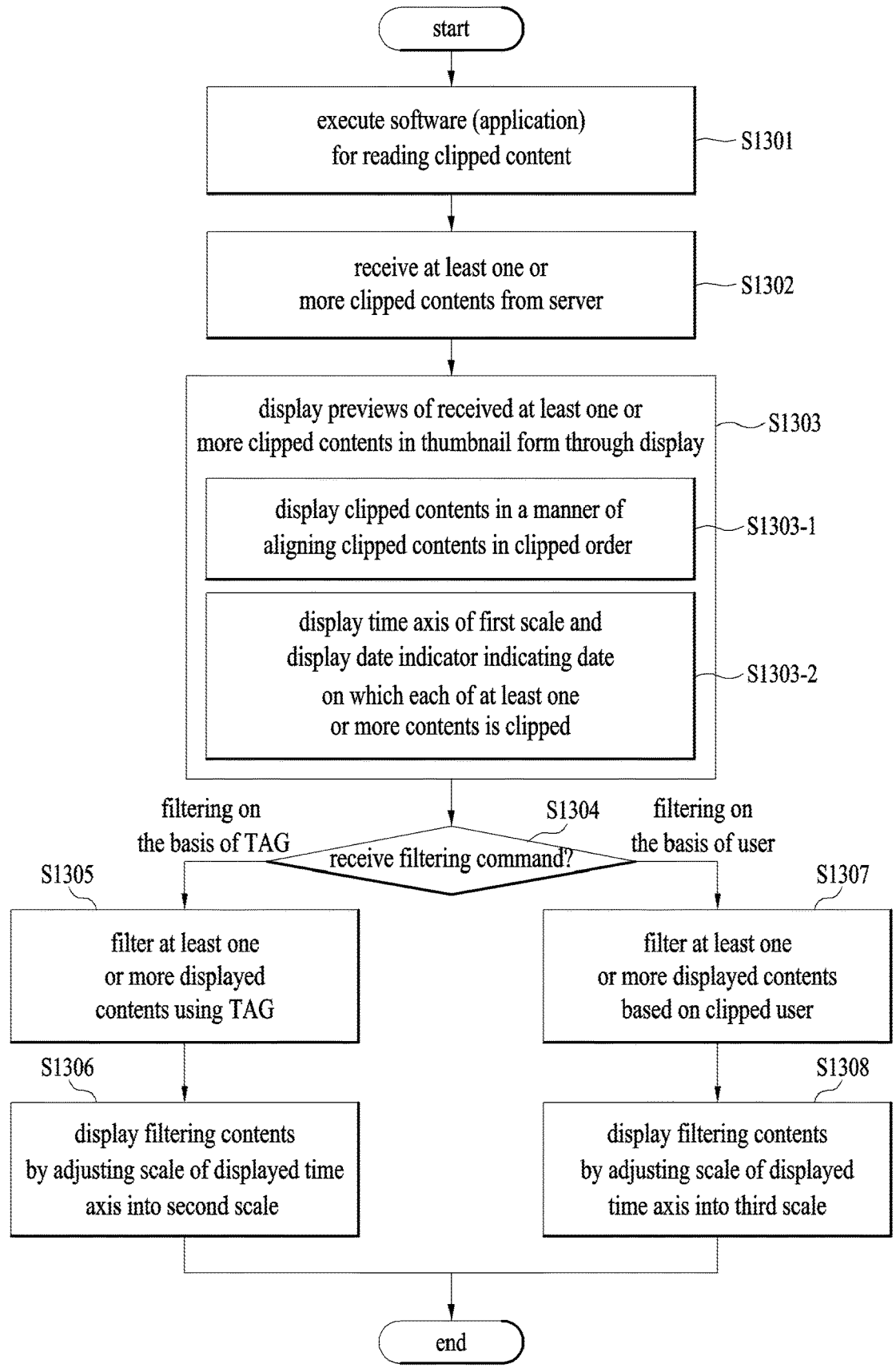
FIG. 13 is a flowchart for a method of reading clipped contents in a terminal according to one embodiment of the present invention.

FIG. 13 is a flowchart for a method of reading clipped contents in a terminal according to one embodiment of the present invention.

In the step S1301, the controller 180 can execute software (or an application) for reading clipped contents.

In the step S1302, the controller 180 can receive at least one or more clipped contents from the server 400.

In the step S1303, the controller 180 can display previews of the at least one or more clipped contents received in the step S1302. In this case, the previews, which are displayed according to one embodiment of the present invention, can be displayed in a manner of being aligned according to a clipped order [S1303-1]. And, the previews, which are displayed according to one embodiment of the present invention, can further display a time axis 700 including a first scale and date indicators 71-1 and 71-2 indicating a date on which each of the at least one or more contents is clipped [S1303-2].

In the step S1304, the controller 180 receives a filtering command. If the received filtering command corresponds to a command for filtering on the basis of a tag, it may proceed to the step S1305. If the received filtering command corresponds to a command for filtering on the basis of a user, it may proceed to the step S1307.

In the step S1305, the controller 180 can filter (or search for) the at least one or more displayed contents using a tag selected by a user. In the step S1306, the controller can control the display 151 to adjust the scale of the displayed time axis 700 to a second scale and display the second scale together with the filtered contents.

In the step S1307, the controller 180 can filter (or search for) the at least one or more displayed contents using a user selected by a user. In the step S1308, the controller can control the display 151 to adjust the scale of the displayed time axis 700 to a third scale and display the third scale together with the filtered contents.

Meanwhile, if a transceived message itself or content related to the transceived message is clipped in the middle of executing an application of transceiving the text message with a different user, one embodiment of the present invention proposes to provide a date notification to a user. The date notification may correspond to a notification on a date included in clipping target content. Regarding this embodiment, it is explained with reference to FIGS. 14 and 15 in the following.

Figure 14:
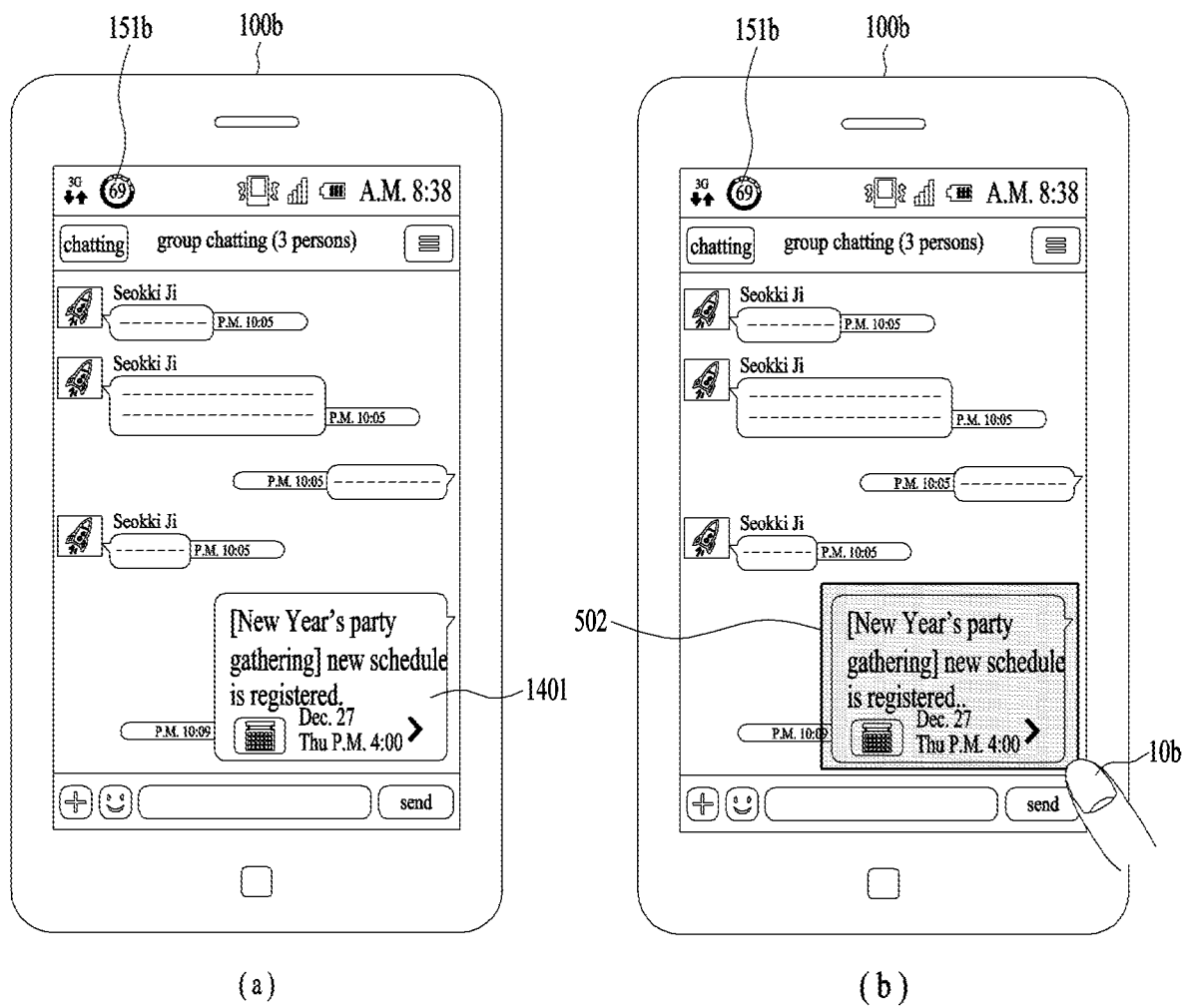
FIG. 14 is a diagram for an example of a method of clipping a transceived message (or, contents related to the transceived message) on an execution screen of a message transceiving application according to one embodiment of the present invention.

FIG. 14 is a diagram for an example of a method of clipping a transceived message (or, contents related to the transceived message) on an execution screen of a message transceiving application according to one embodiment of the present invention.

Referring to FIGS. 14 (a) and (b), the controller 180 displays a state of a message application through the display 151 and displays a conversation history on a specific conversation window. If an input 10b of designating a prescribed area 502 among the conversation history is received, the controller 180 can clip content 1401 included in the prescribed area 502. If the content includes data on a prescribed date, one embodiment of the present invention proposes that the controller 180 provides a notification on the prescribed date (including time as well) to a user. Referring to an example shown in FIG. 14, among the conversation history, the clipping target content 1401 corresponds to content of guiding a schedule and includes a date (Dec. 27th) on "New Year's party gathering".

A notification can be provided to a user through sound, vibration, words of guidance or the like when a corresponding date arrives. Moreover, according to one embodiment of the present invention, a notification can be provided on a clipped content reading screen as well. The notification provided on the clipped content reading screen is explained in the following with reference to FIG. 15.

Figure 15:
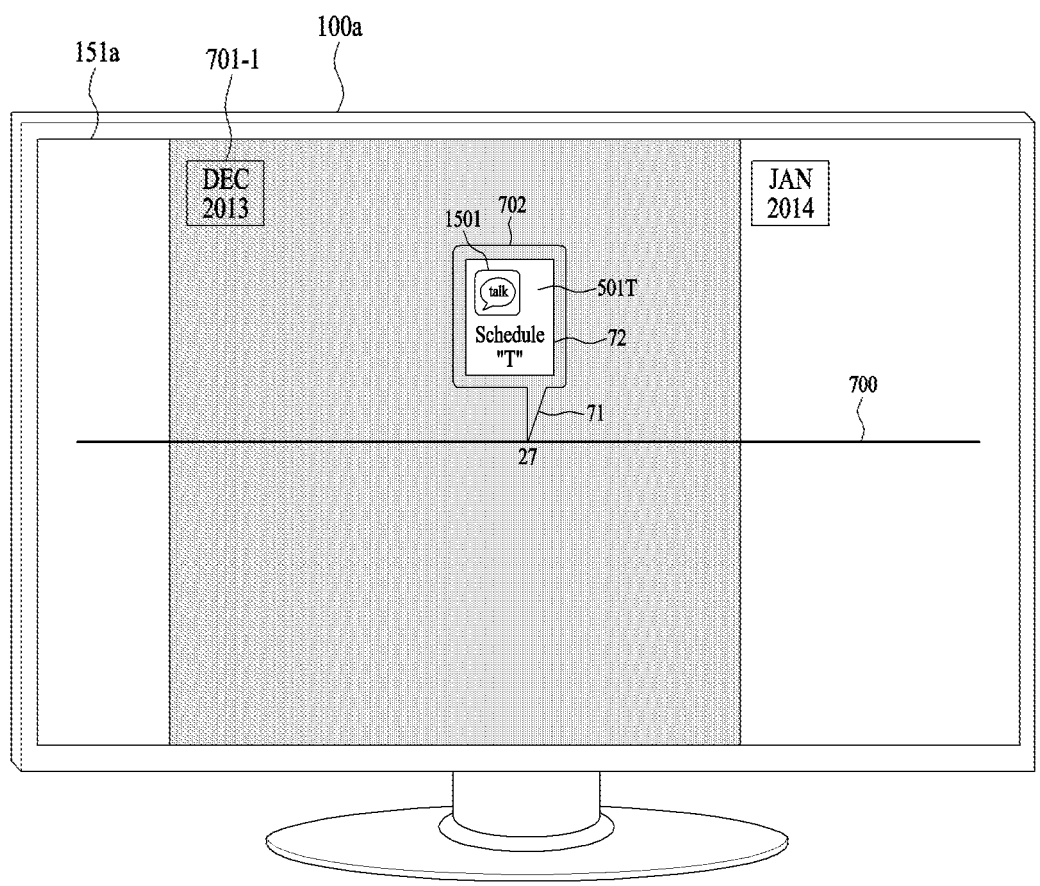
FIG. 15 is a diagram for a state of providing notification on a date included in clipped contents according to one embodiment of the present invention.

FIG. 15 is a diagram for a state of providing notification on a date included in clipped contents according to one embodiment of the present invention. In particular, FIG. 15 shows a content reading screen for the clipped content 1401 shown in FIG. 14.

As mentioned in the foregoing description, the clipped content reading screen can include a time axis 700. In FIG. 14, the clipped content 1401 includes date information (Dec. 27th) on a specific schedule. The controller 180 can control a notification indicator 702 to be displayed on the time axis 700 to indicate the schedule included in the clipped content 1401. Referring to the example shown in FIG. 15, the notification indicator 702 has a form of a speech balloon and includes a date indicator 71 in a form of a tail of the speech balloon. In order to indicate the date information (Dec. 27th) included in the clipped content 1401, the date indicator 71 is displayed in a manner of indicating 27th day on the time axis 700.

In addition, if a date corresponding to the date information arrives, the controller 180 can inform a user that a schedule has arrived through sound, vibration, word of guidance, or the like.

Meanwhile, when a plurality of contents clipped on a same date are displayed as a group, one embodiment of the present invention proposes to display a preview thumbnail for a partial representative content only instead of displaying preview thumbnails of a plurality of the clipped contents. Regarding this embodiment, it is explained with reference to FIG. 16 in the following.

Figure 16:
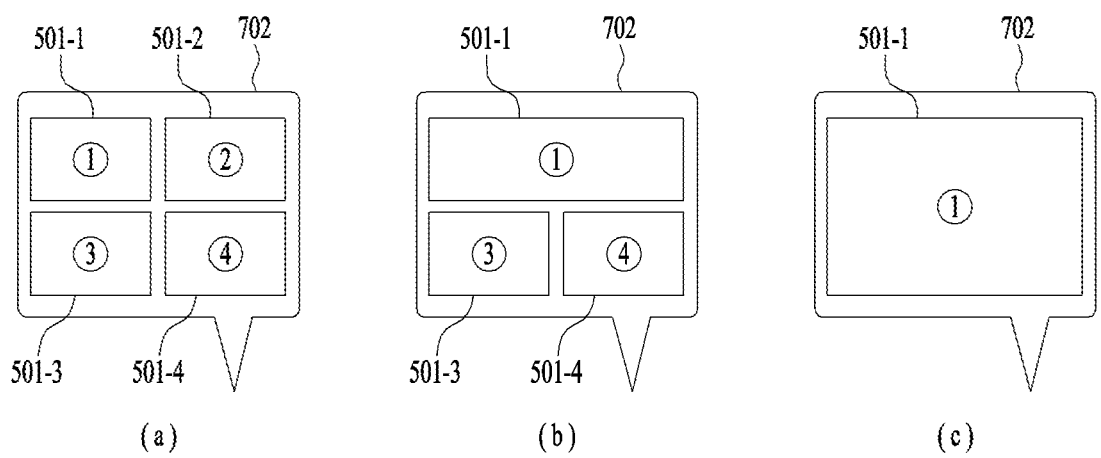
FIG. 16 is a diagram for examples of displaying preview thumbnails of a plurality of contents, which are displayed as a group, according to one embodiment of the present invention.

FIG. 16 is a diagram for examples of displaying preview thumbnails of a plurality of contents, which are displayed as a group, according to one embodiment of the present invention.

In the examples to be described in FIG. 16, assume that there exist four contents clipped on a specific date 501-1 to 501-4. Moreover, as shown in the aforementioned example of the clipping method mentioned earlier with reference to FIGS. 5a to 5c, it is able to clip a plurality of contents by a single clipping operation. Assume that 501-1 and 501-2 contents are clipped by a single clipping operation.

FIG. 16 (a) shows preview thumbnails for a plurality of contents displayed as a single group according to a first example. According to the first example, preview thumbnails are all displayed in response to a plurality of the contents displayed as a single group. As shown in FIGS. 16 (a), 501-1 to 501-4 contents are displayed as a single group and the controller 180 can display all preview thumbnails in response to each of a plurality of the contents.

FIG. 16 (b) shows preview thumbnails for a plurality of contents displayed as a single group according to a second example. According to the second example, preview thumbnails for a plurality of the contents clipped by a single clipping operation can be displayed by a preview thumbnail of representative content only among a plurality of the contents. In particular, as mentioned earlier in the assumption, when the 501-1 and the 501-2 contents correspond to contents clipped by a single clipping operation, a preview thumbnail for representative content among the two contents is displayed only. As shown in FIG. 16 (c), if the 501-1 content is configured as the representative content, the controller 180 displays a preview thumbnail for the 501-1 content only.

A method of configuring content as representative content is explained in the following. According to one embodiment of the present invention, content including the largest number of notifications associated with a different application is configured as representative content. For example, if it is assumed that the 501-1 content is associated with three applications and the 501-2 content is associated with one application, the controller can configure the 501-1 content as representative content.

Or, according to a different embodiment of the present invention, representative content can be configured based on attributes of two contents. An attribute of content can include at least one selected from the group consisting of image content, video content and text content. In general, in case of the text content, it is not appropriate to display a preview. This is because, since a thumbnail is displayed in a small size in general, it is not easy to read text in a small size thumbnail. Hence, in case of determining representative content from among a plurality of contents, if text content and contents of a different attribute coexist, other contents except the text content can be configured as the representative content.

FIG. 16 (c) shows a preview thumbnail for a plurality of contents displayed as a single group according to a third example. According to the third example, a preview thumbnail for single representative content among clipped contents belonging to a single group can be displayed only. The third example may correspond to an example appropriate for a case that a size of the display 151 is not that big.

Figure 17:
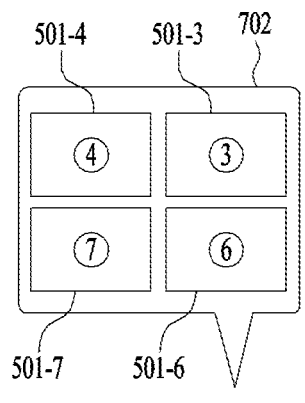
FIG. 17 is a diagram for a method of prioritizing a plurality of clipped contents and displaying a preview thumbnail according to priority in accordance with one embodiment of the present invention.

FIG. 17 is a diagram for a method of prioritizing a plurality of clipped contents and displaying a preview thumbnail according to priority in accordance with to one embodiment of the present invention.

Referring to FIG. 17 (a), it shows a list 1701 of a plurality of clipped contents displayed as a single group. A plurality of the contents include a first to a seventh content 501-1 to 501-7. A first column 1701-1 of the list 1701 includes clipped contents and a second column 1701-2 includes the number of applications linked with each of the contents included in the first column 1701-1.

The number of applications linked with content is explained. According to the aforementioned embodiment, contents can be associated with an application while a clipping operation is performed. For example, when a clipping operation is performed on prescribed content in which prescribed data is included, the controller 180 can provide a notification on a date corresponding to the prescribed date to a user in a manner of associating the prescribed content with a notification application.

In case of displaying preview thumbnails for a plurality of contents as a single group, one embodiment of the present invention proposes to set a limit on the number of the preview thumbnails to a prescribed number (refer to FIG. 17 (*b*)).

Referring to FIG. 17 (*b*), the controller 180 displays a plurality of the contents of the list 1701 shown in FIG. 17 (*a*) as a single group and the number of the preview thumbnails is restricted to 4. In particular, the controller 180 prioritizes a plurality of the contents of the list 1701 shown in FIG. 17 (*a*), selects 4 contents from a plurality of the contents based on the determined priority and may be then able to display preview thumbnails for the 4 contents as a single group. Moreover, one embodiment of the present invention proposes to determine an order of displaying the preview thumbnails in the group according to the priority. In particular, according to the example of FIG. 17, the controller 180 outputs preview thumbnails in a speech balloon in a descending order of the number of applications associated with content.

According to one embodiment of the present invention, priority for a plurality of contents can be designated according to the number of linked applications. This is because, if the number of linked application is high, it is highly probable that a user has a chance of frequently using corresponding content. Hence, in the example shown in FIG. 17, according to the priority, priority can be determined up to 4 in an order of fourth content 501-4, third content 501-3, seventh content 501-7 and sixth content 501-6. Then, the controller 180 can control the display 151 to display preview thumbnails in a speech balloon 702 in an order of the fourth content 501-4, the third content 501-3, the seventh content 501-7 and the sixth content 501-6.

Meanwhile, although the aforementioned priority is explained based on the number of linked applications, by which the present invention may be non-limited. For example, priority can also be determined based on a descending order of the number of linked notifications.

It will be apparent to those skilled in the art that various modifications and variations can be made therein without departing from the spirit and scope of the present specification.

The present invention mentioned in the foregoing description can be implemented by codes readable by a computer in media in which a program is recorded. Media readable by a computer includes all kinds of recording devices in which data readable by a computer system is stored. Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet). And, the computer may include a controller 180 of a terminal.

While the present specification has been described and illustrated herein with reference to the preferred embodiments and diagrams thereof, the present specification may be non-limited to the aforementioned embodiments. Thus, it is intended that the present specification covers the modifications and variations of this invention that come within the scope of the appended claims and their equivalents.

Embodiments of the present invention can be used for a mobile terminal of various forms.

What is claimed is:

1. A terminal comprising:
a display;
a memory configured to store clipped contents;
a wireless communication processor configured to receive the clipped contents; and
a processor configured to:
control the display to display a plurality of contents,
in response to an input for selecting a partial area of the display, output a first pop-up window indicating whether to clip contents of the partial area among the plurality of contents,
in response to a selection to clip the contents in the partial area, clip the contents of the partial area to generate a plurality of clipped contents,
control the display to display a time axis of a first scale,
display a plurality of preview thumbnails corresponding to the plurality of clipped contents,
display a plurality of date indicators indicating dates corresponding to the plurality of the preview thumbnails on the displayed time axis,
wherein a single date indicator among the plurality of date indicators is assigned for a first preview thumbnail among the plurality of the displayed preview thumbnails and a second preview thumbnail among the plurality of the displayed preview thumbnails along the displayed time axis,
in response to a user selecting the first preview thumbnail, output a second pop-up window displaying: a first clipped content corresponding to the first preview thumbnail, a second clipped content corresponding to the second preview thumbnail, a reading indicator, in a first area of the second pop-up window, indicating whether the user has read the displayed first and second clipped contents, and a share icon in a second area of the second pop-up window, and
in response to the user selecting the share icon, control the displayed first and second clipped content to be shared with a different terminal,
wherein the first scale is determined based on an interval of a clipped date between clipped contents corresponding to two other preview thumbnails among the plurality of the displayed preview thumbnails, and
wherein one of the first and second clipped contents is an image or video content and the other of the first and second contents is a text content.

2. The terminal of claim 1, wherein the two other preview thumbnails correspond to most recently registered clipped content and firstly registered clipped content.

3. The terminal of claim 1, further comprising a user input unit configured to receive selection of at least one or more tags from the user,
wherein the processor is configured to display a part of the plurality of the preview thumbnails in a manner of filtering the plurality of the preview thumbnails based on the selected tag and display the displayed time axis by adjusting the first scale to a second scale.

4. The terminal of claim 3, wherein the second scale is determined based on an interval of a clipped date between clipped contents corresponding to another two preview thumbnails among the part of the plurality of the preview thumbnails.

5. The terminal of claim 1, further comprising a user input unit configured to receive selection of at least one or more users from the user,
wherein the processor is configured to display a part of the plurality of the preview thumbnails by filtering the plurality of the preview thumbnails based on the selected one or more users and display the time axis by adjusting the first scale to a second scale.

6. The terminal of claim 5, wherein the second scale is determined based on an interval of a clipped date between clipped contents corresponding to another two preview thumbnails among the part of the plurality of the preview thumbnails displayed by being filtered.

7. The terminal of claim 1, wherein the processor is further configured to recognize a content date contained in the clipped contents and display a content notification indicator indicating the recognized content date on the time axis.

8. A method of controlling a terminal, the method comprising:
controlling a display of the terminal to display a plurality of contents,
in response to an input for selecting a partial area of the display, outputting a first pop-up window indicating whether to clip contents of the partial area among the plurality of contents,
in response to a selection to clip the contents in the partial area, clipping the contents of the partial area to generate a plurality of clipped contents,
controlling the display to display a time axis of a first scale, a plurality of preview thumbnails corresponding to the plurality of clipped contents, and a plurality of date indicators indicating dates corresponding to the plurality of the preview thumbnails on the displayed time axis,
wherein the first scale is determined based on an interval of a clipped date between clipped contents corresponding to two preview thumbnails among the plurality of the displayed preview thumbnails,
wherein a single date indicator is assigned for a first other preview thumbnail among the plurality of the displayed preview thumbnails and a second other preview thumbnail among the plurality of the displayed preview thumbnails along the displayed time axis,
wherein the method further comprises:
in response to a user selecting the first other preview thumbnail, outputting a second pop-up window displaying: a first clipped content corresponding to the first other preview thumbnail, a second clipped content corresponding to the second other preview thumbnail, a reading indicator, in a first area of the second pop-up window, indicating whether the user has read the displayed first and second clipped contents and a share icon in a second area of the second pop-up window, and
in response to the user selecting the share icon, controlling the displayed first and second clipped content to be shared with a different terminal, and
wherein one of the first and second clipped contents is an image or video content and the other of the first and second is a text content.

9. The method of claim 8, wherein the two preview thumbnails correspond to most recently registered clipped content and firstly registered clipped content.

10. The method of claim 8, further comprising:
receiving selection of at least one or more tags from the user;
displaying a part of the plurality of the preview thumbnails by filtering the plurality of the preview thumbnails based on the selected tag; and
displaying the time axis by adjusting the first scale to a second scale.

11. The method of claim 10, wherein the second scale is determined based on an interval of a clipped date between clipped contents corresponding to another two preview thumbnails among the part of the plurality of the preview thumbnails.

12. The method of claim 8, further comprising:
receiving selection of at least one or more users from the user;
displaying a part of the plurality of the preview thumbnails by filtering the plurality of the preview thumbnails based on the selected one or more; and
displaying the time axis by adjusting the first scale to a second scale.

13. The method of claim 12, wherein the second scale is determined based on an interval of a clipped date between clipped contents corresponding to another two preview thumbnails among the part of the plurality of the preview thumbnails displayed by being filtered.

14. The method of claim 8, further comprising:
recognizing a content date contained in the clipped contents; and
displaying a content notification indicator indicating the recognized content date on the time axis.

* * * * *